United States Patent
Ishikawa et al.

(10) Patent No.: US 12,411,235 B2
(45) Date of Patent: Sep. 9, 2025

(54) OBJECT DETECTION DEVICE, OBJECT DETECTION METHOD, AND COMPUTER-READABLE STORAGE MEDIUM

(71) Applicant: Mitsubishi Electric Corporation, Tokyo (JP)

(72) Inventors: Kentaro Ishikawa, Tokyo (JP); Ryota Iwaizono, Tokyo (JP); Hiroki Fujiyoshi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 301 days.

(21) Appl. No.: 18/213,594

(22) Filed: Jun. 23, 2023

(65) Prior Publication Data
US 2024/0288574 A1    Aug. 29, 2024

(30) Foreign Application Priority Data
Feb. 24, 2023   (JP) .................... 2023-026888

(51) Int. Cl.
*G01S 13/931* (2020.01)
*G01S 7/41* (2006.01)

(52) U.S. Cl.
CPC .............. *G01S 13/931* (2013.01); *G01S 7/41* (2013.01)

(58) Field of Classification Search
None
See application file for complete search history.

(56) References Cited

U.S. PATENT DOCUMENTS

| | | | | |
|---|---|---|---|---|
| 4,577,192 | A * | 3/1986 | Wiegand ............ | G01S 7/38 342/14 |
| 4,633,254 | A * | 12/1986 | Giaccari .............. | G01S 7/2923 342/91 |
| 6,847,324 | B1 * | 1/2005 | Honey ................ | G01S 7/2922 342/91 |
| 2005/0271253 | A1 | 12/2005 | Ohta et al. | |
| 2017/0254896 | A1 * | 9/2017 | Yamamoto .......... | G01S 7/354 |
| 2020/0174488 | A1 * | 6/2020 | Yoo .................... | G01S 13/931 |

FOREIGN PATENT DOCUMENTS

| | | | | |
|---|---|---|---|---|
| CN | 103018722 B | * | 7/2014 | ........... G01S 7/36 |
| CN | 108263389 B | * | 8/2019 | ........... B60W 50/00 |
| JP | H0342435 B2 | * | 6/1991 | ........... G01S 13/87 |
| JP | 04054478 A | * | 2/1992 | ........... G01S 7/295 |
| JP | 4311861 B2 | | 8/2009 | |

* cited by examiner

Primary Examiner — Bernarr E Gregory
(74) Attorney, Agent, or Firm — Sughrue Mion, PLLC

(57) ABSTRACT

This object detection device includes: a radar erroneous detection determination unit which sets, as true, a radar erroneous detection suspicion flag for radar detected object information determined to be suspected as erroneous detection; a fusion processing unit which outputs fusion object information on the basis of second sensor detected object information and the radar detected object information acquired from the radar erroneous detection determination unit; and a radar erroneous detection removal unit which removes fusion object information determined to be suspected as erroneous detection. When a fusion object is determined to be an object detected by only a radar, the fusion processing unit sets a single-sensor detection flag for the fusion object information, as true. The radar erroneous detection removal unit removes the fusion object information for which the radar erroneous detection suspicion flag is true and the single-sensor detection flag is true.

15 Claims, 10 Drawing Sheets

OBJECT DETECTION DEVICE, OBJECT DETECTION METHOD, AND COMPUTER-READABLE STORAGE MEDIUM

BACKGROUND OF THE INVENTION

1. Field of the Invention

The present disclosure relates to an object detection device, an object detection method, and a computer-readable storage medium.

2. Description of the Background Art

There is known an object detection device for detecting an object around a vehicle using a sensor mounted to a vehicle. Information about an object detected by the object detection device is used for performing notification or warning to a driver and is used in an automated driving system for controlling the vehicle so as to avoid collision with the object, or the like.

Further, there is known a sensor fusion technology in which a plurality of sensors are provided and pieces of information from the respective sensors are combined so that pieces of information unique to the respective sensors are fused, thereby performing object detection with higher accuracy. For example, in a case where a millimeter-wave radar (hereinafter, simply referred to as "radar") and a camera are provided on the front side of a vehicle, they are arranged such that a part of the detection range of the radar and a part of the detection range of the camera overlap each other. A radar detection device which detects an object on the basis of output of the radar can perform object detection over a long distance, and generally has high distance measurement accuracy in the longitudinal direction (depth direction). On the other hand, a camera detection device which detects an object on the basis of output of the camera can detect an obstacle, focusing on a specific type through previous learning, and generally has high distance measurement accuracy in the transverse direction. In addition, the camera detection device can identify the type of an object and output size information about the width and the length of the object. Although some radar detection devices also can output information about the type and the size of the object, camera detection devices can generally perform detection with higher accuracy. In a case of detecting an identical object by the radar detection device and the camera detection device, for example, information outputted from the radar detection device is regarded as more reliable for a distance measurement value in the longitudinal direction, and information outputted from the camera detection device is regarded as more reliable for the type and a distance measurement value in the transverse direction, to calculate various parameters such as the position and the velocity of the object, and these are outputted as fusion object information to a processing block (control system or notification system) at a subsequent stage.

In a case of using a plurality of sensors and generating fusion object information by fusing pieces of information from the respective sensors, if erroneous detection occurs in one sensor, information based on erroneous detection of the one sensor and information from another sensor might be erroneously determined to be an identical object, so that erroneous fusion object information is outputted. In this case, an object that actually does not exist is detected, so that, for example, brake control is erroneously performed for the non-existent object. In the sensor fusion technology using the radar and the camera, in order to prevent erroneous detection based on information from the camera, an object detection device in which a short-distance flag is set for output from the radar and output from the camera is changed in accordance with the state of the flag, is proposed (see, for example, Patent Document 1).

Patent Document 1: Japanese Patent No. 4311861

In the object detection device shown in Patent Document 1, output of an erroneous fusion object due to erroneous detection based on information of the camera can be prevented, but there is a problem that output of an erroneous fusion object due to erroneous detection based on information of the radar cannot be prevented.

SUMMARY OF THE INVENTION

The present disclosure has been made to solve the above problem, and an object of the present disclosure is to provide an object detection device, an object detection method, and an object detection program that prevent output of an erroneous fusion object due to erroneous detection based on information of a radar.

An object detection device according to the present disclosure is for detecting an object on the basis of information from a first detection device which outputs, regarding a radar detected object which is an object detected from output of a radar, radar detected object information including a radar detection position which is position information about the radar detected object, and information from a second detection device which outputs, regarding a second sensor detected object which is an object detected from output of a second sensor different from the radar, second sensor detected object information including a second sensor detection position which is position information about the second sensor detected object, the object detection device including: a radar erroneous detection determination unit which determines whether or not the radar detected object information acquired from the first detection device is suspected as erroneous detection, and sets, as true, a radar erroneous detection suspicion flag for the radar detected object information determined to be suspected as erroneous detection; a fusion processing unit which outputs fusion object information including a fusion object position which is position information about a fusion object, on the basis of the second sensor detected object information and the radar detected object information acquired from the radar erroneous detection determination unit; and a radar erroneous detection removal unit which removes the fusion object information determined to be suspected as erroneous detection. When the radar detected object and the second sensor detected object are determined to be one said fusion object, the fusion processing unit integrates the radar detected object information and the second sensor detected object information for the respective objects as one piece of the fusion object information, and sets a single-sensor detection flag for the integrated fusion object information, as false. When the fusion object is determined to be an object detected by only the radar, the fusion processing unit uses the radar detected object information for the radar detected object as the fusion object information, and sets the single-sensor detection flag for the fusion object information, as true. The radar erroneous detection removal unit removes the fusion object information for which the radar erroneous detection suspicion flag is true and the single-sensor detection flag is true.

The object detection device according to the present disclosure is for detecting an object on the basis of information from the first detection device which outputs, regarding the radar detected object which is an object detected from output of the radar, the radar detected object information including the radar detection position which is position information about the radar detected object, and information from the second detection device which outputs, regarding the second sensor detected object which is an object detected from output of the second sensor different from the radar, the second sensor detected object information including the second sensor detection position which is position information about the second sensor detected object, the object detection device including: the radar erroneous detection determination unit which determines whether or not the radar detected object information acquired from the first detection device is suspected as erroneous detection, and sets, as true, the radar erroneous detection suspicion flag for the radar detected object information determined to be suspected as erroneous detection; the fusion processing unit which outputs the fusion object information including the fusion object position which is position information about the fusion object, on the basis of the second sensor detected object information and the radar detected object information acquired from the radar erroneous detection determination unit; and the radar erroneous detection removal unit which removes the fusion object information determined to be suspected as erroneous detection. When the radar detected object and the second sensor detected object are determined to be one said fusion object, the fusion processing unit integrates the radar detected object information and the second sensor detected object information for the respective objects as one piece of the fusion object information, and sets the single-sensor detection flag for the integrated fusion object information, as false. When the fusion object is determined to be an object detected by only the radar, the fusion processing unit uses the radar detected object information for the radar detected object as the fusion object information, and sets the single-sensor detection flag for the fusion object information, as true. The radar erroneous detection removal unit removes the fusion object information for which the radar erroneous detection suspicion flag is true and the single-sensor detection flag is true. Thus, output of an erroneous fusion object due to erroneous detection based on information of the radar can be prevented.

DETAILED DESCRIPTION OF THE PREFERRED EMBODIMENTS OF THE INVENTION

Figure 1:
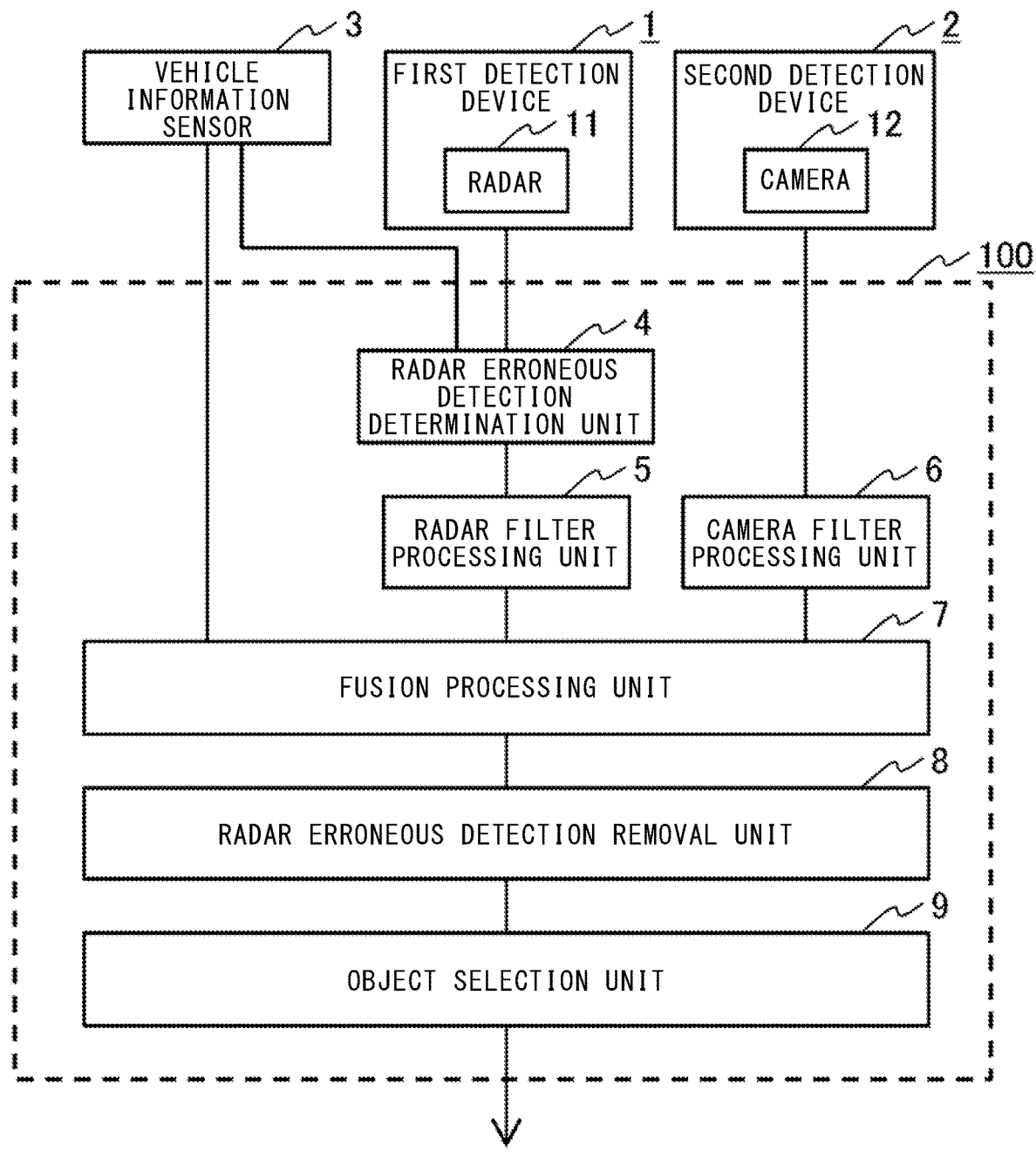
FIG. 1 is a block diagram showing the configuration of an object detection device according to the first embodiment of the present disclosure.

Hereinafter, an object detection device, an object detection method, and an object detection program according to embodiments for carrying out the present disclosure will be described in detail with reference to the drawings. In the drawings, the same reference characters denote the same or corresponding parts.

First Embodiment

FIG. 1 is a block diagram showing the configuration of an object detection device 100 according to the first embodiment of the present disclosure. The object detection device 100 detects an object on the basis of at least information from a first detection device 1 and information from a second detection device 2. In FIG. 1, the object detection device 100 detects an object on the basis of information from the first detection device 1, information from the second detection device 2, and information from a vehicle information sensor 3. The first detection device 1 includes a radar 11, detects an object on the basis of output of the radar 11, and then, regarding a radar detected object which is the object detected on the basis of output of the radar 11, outputs radar detected object information including a radar detection position which is position information about the radar detected object. The second detection device 2 includes a second sensor different from a radar. The second sensor included in the second detection device 2 may be any sensor different from a radar, and may be, for example, a light detection and ranging (LiDAR) sensor, an ultrasonic sensor (sonar sensor), or an infrared camera. In the following description, it is assumed that the second detection device 2 includes a camera 12. The second detection device 2 includes the camera 12 which is the second sensor, detects an object on the basis of output of the camera 12 which is the second sensor, and then, regarding a second sensor detected object which is the object detected on the basis of output of the camera 12 which is the second sensor, outputs second sensor detected object information including a second sensor detection position which is position information about the second sensor detected object. The first detection device 1 and the radar 11 may be identical, and for example, the radar 11 may detect an object and output radar detected object information including a radar detection position which is position information about the radar detected object. The second detection device 2 and the second sensor may be identical, and for example, the camera 12 which is the second sensor may detect an object and output second sensor detected object information including a second sensor detection position which is position information about the second sensor detected object.

Figure 2:
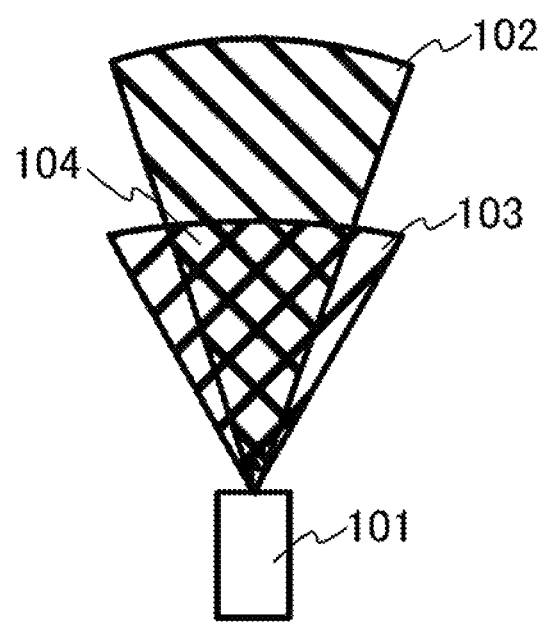
FIG. 2 is a detection range of a radar and a detection range of a camera in the first embodiment.

FIG. 2 shows the detection range of the radar 11 and the detection range of the camera 12 in the first embodiment.

The object detection device 100 is mounted to a vehicle 101, for example, and the radar 11 and the camera 12 are provided on the front side of the vehicle 101. In FIG. 2, a radar detection range 102 which is the detection range of the radar 11 is a range hatched with rightward descending lines, and a camera detection range 103 which is the detection range of the camera 12 is a range hatched with rightward ascending lines. The radar detection range 102 and the camera detection range 103 partially overlap each other, and the part where the radar detection range 102 and the camera detection range 103 overlap each other is a fusion range 104. In FIG. 2, a range where the rightward ascending lines and the rightward descending lines overlap each other is the fusion range 104.

The object detection device 100 detects an object frontward of the vehicle 101, as a fusion object, using output information from the first detection device 1 and output information from the second detection device 2, and outputs a result thereof to a processing block (control system or notification system) at a subsequent stage, thereby realizing automated driving or driving assistance. The object detection device 100 may be mounted in a state of being integrated with or non-separable from another component inside the vehicle 101, or may be mounted in a detachable or separable state. The vehicle information sensor 3 outputs vehicle information such as the velocity, the yaw rate, the azimuth, or the position of the vehicle 101, for example, and the object detection device 100 may detect an object frontward of the vehicle 101 as a fusion object, using output information from the first detection device 1, output information from the second detection device 2, and output information from the vehicle information sensor 3.

The vehicle 101 is, for example, an automobile. However, without limitation thereto, the vehicle 101 may be a four-wheel vehicle such as a truck or a golf cart, a two-wheel vehicle, a personal mobility vehicle (PMV), or a movable body such as an autonomous mobile robot (AMR).

The radar 11 is, for example, a sensor that radiates radio waves in a millimeter-wave band and receives radio waves reflected from a detection target object, thereby measuring a distance and an angle to the object. The first detection device 1 including the radar 11 detects an object on the basis of output of the radar 11. Then, regarding a radar detected object which is the detected object, the first detection device 1 calculates information about a radar detection position which is position information about the detected object on the basis of distance measurement information and angle measurement information, and outputs radar detected object information including the information about the radar detection position. Further, regarding the radar detected object, the first detection device 1 may output, as the radar detected object information, supplementary information such as a velocity, an acceleration, a reflection intensity (or information such as a radar cross-section (RCS) correlated with the reflection intensity), a size (width, length, etc.), a type, or reliability. The radar 11 can detect even an object at a distance of 100 m or more, but the resolution thereof in the transverse direction is low and therefore, for example, in a short distance of 30 m or less, an object present nearby is less likely to be separated through signal processing inside the radar electronic control unit (ECU). As a result, a plurality of different objects (or noises) might be clustered into one object, which is outputted from the first detection device 1, thus causing erroneous detection.

Figure 3:
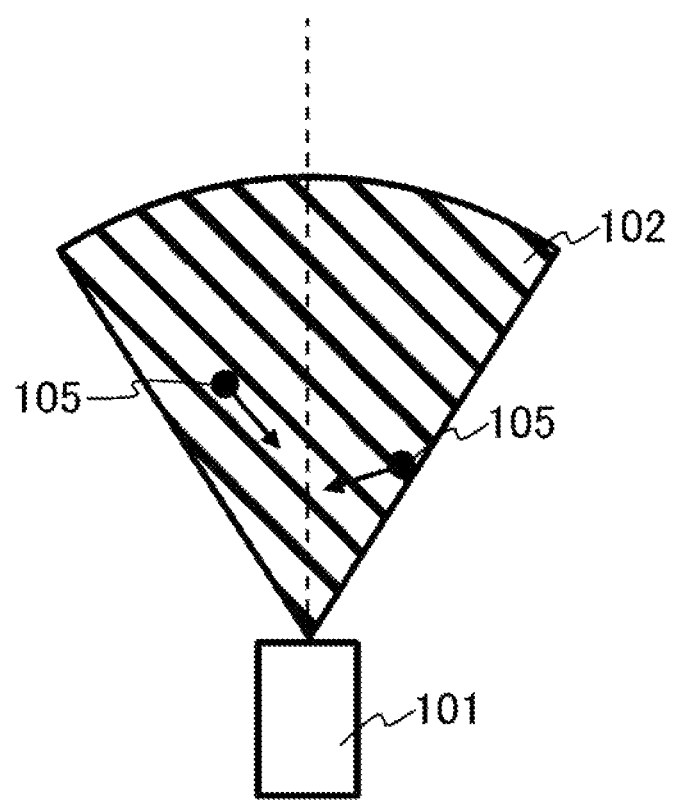
FIG. 3 shows an example of erroneous detection occurring in a first detection device in the first embodiment.
Figure 4:
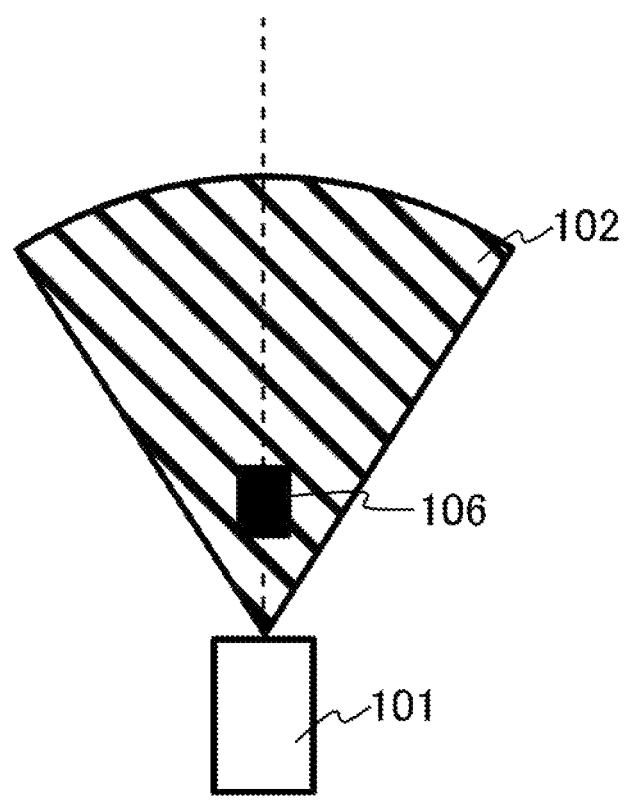
FIG. 4 shows another example of erroneous detection occurring in the first detection device in the first embodiment.

FIG. 3 shows an example of erroneous detection occurring in the first detection device 1 in the first embodiment. Due to the above characteristics of the radar 11, particularly in a short distance, a noise 105 with a behavior of rushing out toward the vehicle center from a lateral side might appear in output of the first detection device 1 during traveling. FIG. 4 shows another example of erroneous detection occurring in the first detection device 1 in the first embodiment. Due to the above characteristics of the radar 11, particularly in a short distance, a noise 106 having a large size might appear in output of the first detection device 1 during traveling. Noises such as the noise 105 and the noise 106 cannot completely be removed in the radar ECU processing, and it is difficult to assuredly discriminate them from an actually existing pedestrian who crosses or rushes out or an actually existing vehicle in a short distance.

The second detection device 2 detects an object on the basis of output of the camera 12, and undergoes learning of images in advance, to detect an object appearing in the angle of view of the camera 12. Examples of detection targets include a human, an automobile, a bicycle, and a two-wheel vehicle. Regarding a second sensor detected object which is the detected object, the second detection device 2 calculates information about a second sensor detection position which is position information of the detected object on the basis of information acquired from the camera 12, and outputs second sensor detected object information including the second sensor detection position. As the camera 12, a monocular camera to obtain a transverse position and an approximate longitudinal position can be used mainly for identifying the type of an object, or a binocular camera (stereo camera) can be used to obtain a more accurate longitudinal position. The camera 12 may be either a monocular camera or a binocular camera.

A radar erroneous detection determination unit 4 of the object detection device 100 receives pieces of radar detected object information corresponding to the number of detected objects from the first detection device 1, and determines whether or not each piece of radar detected object information is suspected as erroneous detection. The radar erroneous detection determination unit 4 sets, as true, a radar erroneous detection suspicion flag for the radar detected object information determined to be suspected as erroneous detection, sets, as false, a radar erroneous detection suspicion flag for the radar detected object information not determined to be suspected as erroneous detection, and then outputs the radar detected object information. After determining whether or not each piece of radar detected object information is suspected as erroneous detection, the radar erroneous detection determination unit 4 may add radar erroneous detection information indicating determination that there is suspicion of erroneous detection, to the radar detected object information determined to be suspected as erroneous detection, and output the radar detected object information. The radar erroneous detection determination unit 4 may determine whether or not each piece of radar detected object information is suspected as erroneous detection, on the basis of pieces of radar detected object information corresponding to the number of detected objects outputted from the first detection device 1 and vehicle information outputted from the vehicle information sensor 3. A determination method for erroneous detection in the radar erroneous detection determination unit 4 will be described in detail later.

A radar filter processing unit 5 performs radar filter processing on the radar detected object information acquired from the radar erroneous detection determination unit 4, and outputs a result in which unnecessary radar detected object information has been removed. In the radar filter processing in the radar filter processing unit 5, for example, in a case where the position range of objects that will be final control or notification targets is set as a detection target range in advance, radar detected object information of which the radar detection position is outside the detection target range may be removed. In the radar filter processing in the radar filter processing unit 5, for example, in a case where information about a detected object velocity which is the velocity of the radar detected object is included in the radar detected object information, radar detected object information of which the detected object velocity exceeds a predetermined normal value velocity range may be removed. In the radar filter processing in the radar filter processing unit 5, for example, in a case where information about a detected object acceleration which is the acceleration of the radar detected object is included in the radar detected object information, radar detected object information of which the detected object acceleration exceeds a predetermined normal value acceleration range may be removed. Here, the normal value velocity range and the normal value acceleration range may be set from an invalid value or an abnormal value prescribed as specifications of the radar 11, or may be set in accordance with the method of application to final control or notification. More specifically, the normal value velocity range and the normal value acceleration range may be set such that information for an object moving at a high speed that cannot occur in a traveling area is removed even if the value is a normal value in terms of output specifications of the radar 11. In the radar filter processing in the radar filter processing unit 5, for example, in a case where information about a detected object reflection intensity which is a reflection intensity for the radar detected object is included in the radar detected object information, radar detected object information of which the detected object reflection intensity is smaller than a predetermined reflection intensity threshold may be removed. As the radar filter processing in the radar filter processing unit 5, any of the above methods may be used or a plurality of the methods may be combined. In a case where the radar filter processing in the radar filter processing unit 5 is not needed, the radar filter processing in the radar filter processing unit 5 may be skipped and a fusion processing unit 7 may acquire the radar detected object information from the radar erroneous detection determination unit 4.

A camera filter processing unit 6 performs camera filter processing on the second sensor detected object information acquired from the second detection device 2, and outputs the second sensor detected object information after the processing, to the fusion processing unit 7. In the camera filter processing in the camera filter processing unit 6, as in the radar filter processing in the radar filter processing unit 5, for example, in a case where the position range of objects that will be final control or notification targets is set as a detection target range in advance, second sensor detected object information of which the second sensor detection position is outside the detection target range may be removed. In a case where the camera filter processing in the camera filter processing unit 6 is not needed, the camera filter processing in the camera filter processing unit 6 may be skipped and the fusion processing unit 7 may acquire the second sensor detected object information from the second detection device 2.

The fusion processing unit 7 performs sensor fusion processing (hereinafter, may be simply referred to as "fusion processing") on the basis of the radar detected object information acquired from the radar filter processing unit 5 and the second sensor detected object information acquired from the camera filter processing unit 6, and regarding a fusion object obtained as a fusion processing result, outputs fusion object information including a fusion object position which is position information about the fusion object. In a case where the radar filter processing by the radar filter processing unit 5 and the camera filter processing by the camera filter processing unit 6 are skipped, the fusion processing unit 7 performs fusion processing on the basis of the radar detected object information acquired from the radar erroneous detection determination unit 4 and the second sensor detected object information acquired from the second detection device 2, and regarding a fusion object obtained as a fusion processing result, outputs fusion object information including a fusion object position which is position information about the fusion object.

In the fusion processing, first, each piece of radar detected object information and each piece of second sensor detected object information are compared with each other, and whether or not the radar detected object and the second sensor detected object are one fusion object is determined from information about the radar detection position and the second sensor detection position. In the fusion processing, for example, the radar detected object information and the second sensor detected object information of which the radar detection position and the second sensor detection position are close to each other, are determined to be information about an identical object, and thus the radar detected object indicated by the radar detected object information and the second sensor detected object indicated by the second sensor detected object information are determined to be one fusion object. In the fusion processing, specifically, when the second sensor detection position of the second sensor detected object is inside a predetermined identical-object determination range including the radar detection position of the radar detected object, the radar detected object and the second sensor detected object are determined to be an identical fusion object, the radar detected object information and the second sensor detected object information for the respective objects are integrated as one piece of fusion object information, and a single-sensor detection flag for the integrated fusion object information is set as false to indicate that the integrated fusion object is the object detected by both of the radar 11 and the second sensor. As a method for indicating that the integrated fusion object is the object detected by both of the radar 11 and the second sensor, for example, first detection information indicating that the integrated fusion object is the object detected by both of the radar 11 and the second sensor may be added to the fusion object information. When the radar detected object information and the second sensor detected object information are integrated as one piece of fusion object information, information included in only one of the radar detected object information or the second sensor detected object information is directly carried over into the fusion object information. For example, since information about the radar erroneous detection suspicion flag is included in only the radar detected object information, information about the radar erroneous detection suspicion flag in the radar detected object information is used as information about the radar erroneous detection suspicion flag in the fusion object information. Regarding information included in both of the radar detected object information and the second sensor detected object information, for example, the one having higher reliability is selected between the respective pieces of information included in the radar detected object information and the second sensor detected object information, and is used for the fusion object information. For example, regarding position information in the longitudinal direction, information included in the radar detected object information is selected, and regarding position information in the transverse direction, information included in the second sensor detected object information is selected. Alternatively, for the fusion object information, instead of selecting either of respective pieces of information included in the radar detected object information and the second sensor detected object information, the respective pieces of information included in the radar detected object information and the second sensor detected object information may be weighted at a predetermined ratio considering data output cycles of the radar 11 and the camera 12, lack of detection thereof, and the like, and the resultant value may be used as a value in the fusion object information.

Next, in the fusion processing, when the second sensor detected object is not detected inside the identical-object determination range including the radar detection position of the radar detected object, the fusion object is determined to be an object detected by only the radar 11, the radar detected object information for the radar detected object is used as the fusion object information, and a single-sensor detection flag for the fusion object information is set as true to indicate that the fusion object is an object detected by only the radar 11. As a method for indicating that the integrated fusion object is an object detected by only the radar 11, for example, second detection information indicating that the fusion object is an object detected by only the radar 11 may be added to the fusion object information. In a case where the radar detected object information does not include information about the type of the radar detected object and the second sensor detected object information includes information about the type of the second sensor detected object, whether the integrated fusion object is an object detected by both of the radar 11 and the second sensor or an object detected by only the radar 11, may be indicated by a fact that information about the type of the second sensor detected object is included in the fusion object information when the integrated fusion object is an object detected by both of the radar 11 and the second sensor.

Regarding determination for whether or not the second sensor detection position of the second sensor detected object is inside the identical-object determination range including the radar detection position of the radar detected object, for example, if a distance from the radar detection position of the radar detected object to the second sensor detection position of the second sensor detected object is smaller than a predetermined first distance threshold, the second sensor detection position may be determined to be inside the identical-object determination range. Specifically, the radar detection position is represented by $(x_1, y_1)$ with $x_1$ as a position in the transverse direction and $y_1$ as a position in the longitudinal direction, the second sensor detection position is represented by $(x_2, y_2)$ with $x_2$ as a position in the transverse direction and $y_2$ as a position in the longitudinal direction, and the first distance threshold is represented by $th_1$. Then, if the following Expression (1) is satisfied, the second sensor detection position may be determined to be inside the identical-object determination range.

[Mathematical 1]

$$\sqrt{(x_2-x_1)^2+(y_2-y_1)^2} < th_1 \qquad (1)$$

Alternatively, regarding determination for whether or not the second sensor detection position of the second sensor detected object is inside the identical-object determination range including the radar detection position of the radar detected object, for example, if a difference between the position in the transverse direction of the radar detection position of the radar detected object and the position in the transverse direction of the second sensor detection position of the second sensor detected object is smaller than a predetermined transverse threshold, and a difference between the position in the longitudinal direction of the radar detection position of the radar detected object and the position in the longitudinal direction of the second sensor detection position of the second sensor detected object is smaller than a predetermined longitudinal threshold, the second sensor detection position may be determined to be inside the identical-object determination range. Specifically, the radar detection position is represented by $(x_1, y_1)$, the second sensor detection position is represented by $(x_2, y_2)$, the transverse threshold is represented by thx, and the longitudinal threshold is represented by thy. Then, if the following Expression (2) and Expression (3) are satisfied, the second sensor detection position may be determined to be inside the identical-object determination range.

[Mathematical 2]

$$|x_2 - x_1| < th_x \qquad (2)$$

$$|y_2 - y_1| < th_y \qquad (3)$$

In the fusion processing, the radar detection position is represented by $(x_1, y_1)$, a velocity in the longitudinal direction, i.e., a velocity in the depth direction, of the radar detected object is represented by $vy_1$, the second sensor detection position is represented by $(x_2, y_2)$, a velocity in the longitudinal direction, i.e., a velocity in the depth direction, of the second sensor detected object is denoted by $vy_2$, the first distance threshold is represented by $th_1$, and a longitudinal velocity threshold is represented by $th_{vy}$. Then, if the above Expression (1) is satisfied and the following Expression (4) is satisfied, the radar detected object and the second sensor detected object may be determined to be one fusion object. At this time, in the fusion processing, using the radar detection position of the radar detected object as a reference, if the second sensor detected object for which Expression (1) and Expression (4) are satisfied is not detected, the fusion object may be determined to be an object detected by only the radar 11.

[Mathematical 3]

$$|vy_2 - vy_1| < th_{vy} \qquad (4)$$

Alternatively, in the fusion processing, the radar detection position is represented by $(x_1, y_1)$, a velocity in the longitudinal direction, i.e., a velocity in the depth direction, of the radar detected object is represented by $vy_1$, the second sensor detection position is represented by $(x_2, y_2)$, a velocity in the longitudinal direction, i.e., a velocity in the depth direction, of the second sensor detected object is represented by $vy_2$, the transverse threshold is represented by thx, the longitudinal threshold is represented by thy, and the longitudinal velocity threshold is represented by $th_{vy}$. Then, if the above Expression (2) and Expression (3) are satisfied and the above Expression (4) is satisfied, the radar detected object and the second sensor detected object may be determined to be one fusion object. At this time, in the fusion processing, using the radar detection position of the radar detected object as a reference, if the second sensor detected object for which Expression (2), Expression (3), and Expression (4) are satisfied is not detected, the fusion object may be determined to be an object detected by only the radar 11.

Alternatively, in the fusion processing, the radar detection position is represented by $(x_1, y_1)$, a velocity of the radar detected object is represented by $(vx_1, vy_1)$ with $vx_1$ as a velocity in the transverse direction and $vy_1$ as a velocity in the longitudinal direction, i.e., a velocity in the depth direction, the second sensor detection position is represented by $(x_2, y_2)$, a velocity of the second sensor detected object is represented by $(vx_2, vy_2)$ with $vx_2$ as a velocity in the transverse direction and $vy_2$ as a velocity in the longitudinal direction, i.e., a velocity in the depth direction, the first distance threshold is represented by $th_1$, and a velocity threshold is represented by $th_v$. Then, if the above Expression (1) is satisfied and the following Expression (5) is satisfied, the radar detected object and the second sensor detected object may be determined to be one fusion object. At this time, in the fusion processing, using the radar detection position of the radar detected object as a reference, if the second sensor detected object for which Expression (1) and Expression (5) are satisfied is not detected, the fusion object may be determined to be an object detected by only the radar 11.

[Mathematical 4]

$$\sqrt{(vx_2 - vx_1)^2 + (vy_2 - vy_1)^2} < th_v \qquad (5)$$

Alternatively, in the fusion processing, the radar detection position is represented by $(x_1, y_1)$, a velocity of the radar detected object is represented by $(vx_1, vy_1)$, the second sensor detection position is represented by $(x_2, y_2)$, a velocity of the second sensor detected object is represented by $(vx_2, vy_2)$, the transverse threshold is represented by $th_x$, the longitudinal threshold is represented by $th_y$, a third transverse velocity threshold is represented by $th_{vx}$, and the longitudinal velocity threshold is represented by $th_{vy}$. Then, if the above Expression (2), Expression (3), and Expression (4) are satisfied and the following Expression (6) is satisfied, the radar detected object and the second sensor detected object may be determined to be one fusion object. At this time, in the fusion processing, using the radar detection position of the radar detected object as a reference, if the second sensor detected object for which Expression (2), Expression (3), Expression (4), and Expression (6) are satisfied is not detected, the fusion object may be determined to be an object detected by only the radar 11.

[Mathematical 5]

$$|vx_2 - vx_1| < th_{vx} \qquad (6)$$

Alternatively, in the fusion processing, whether or not the radar detected object and the second sensor detected object are one fusion object may be determined using a combination of any expressions of Expressions (1) to (6).

The fusion processing unit 7 may perform the fusion processing on the basis of the radar detected object information acquired from the radar filter processing unit 5, the second sensor detected object information acquired from the camera filter processing unit 6, and the vehicle information acquired from the vehicle information sensor 3, and regarding the fusion object obtained as a fusion processing result, may output fusion object information including a fusion object position which is position information about the fusion object. For example, on the basis of the radar detected object information, the second sensor detected object information, and the vehicle information, a velocity relative to ground of each radar detected object and a velocity relative to ground of a second sensor detected object may be calculated, and for each radar detected object and each second sensor detected object, whether the object is a static object or a moving object may be determined. Further, even when the second sensor detection position of the second sensor detected object is inside the predetermined identical-object determination range including the radar detection position of the radar detected object, if one of the radar detected object and the second sensor detected object is a static object and the other is a moving object, it may be determined that the radar detected object and the second sensor detected object are not one fusion object. Alternatively, even when the second sensor detection position of the second sensor detected object is inside the predetermined identical-object determination range including the radar detection position of the radar detected object, if one of the radar detected object and the second sensor detected object is a static object and the other is a moving object, a threshold or the like may be changed so that the radar detected object and the second sensor detected object are less likely to be determined to be one fusion object.

In a case where only an object detected by both of the radar 11 and the second sensor is treated as a fusion object, regarding an object that is detected by the radar 11 but is not detected by the second sensor or an object that is not a detection target of the second detection device 2 when the second sensor is the camera 12 (an object of a type not learned in advance), such an object cannot be detected and outputted as a fusion object. In the object detection device 100 according to the first embodiment, an object detected by only the radar 11 is also treated as a fusion object, whereby information about an object detected by only the radar 11 can be prevented from being erroneously removed.

Depending on the shape, the size, the material, and the like of an object to be detected, there is a case where the object is detected as a plurality of objects by the first detection device 1 or the second detection device 2 even though they are actually one object. Therefore, in the fusion processing in the fusion processing unit 7, integration processing may be performed to integrate, as one object, a plurality of fusion objects for which the distance between the fusion object positions included in the respective pieces of fusion object information is smaller than a predetermined third distance threshold. In the integration processing, for example, when the distance between the fusion object positions included in respective pieces of fusion object information is smaller than the predetermined third distance threshold, the respective pieces of fusion object information are integrated into one piece of information. When a plurality of pieces of fusion object information are integrated into one piece of information, information having high reliability may be selected from the respective pieces of fusion object information so as to be used as newly integrated fusion object information, or pieces of information included in the respective pieces of fusion object information may be weighted at a predetermined ratio and may be used as newly integrated fusion object information. When a plurality of pieces of fusion object information are integrated into one piece of information, the size of an object including all the fusion object positions of the respective pieces of fusion object information may be used as size information of the newly integrated fusion object information. When the values of the radar erroneous detection suspicion flags for all the plurality of pieces of fusion object information to be integrated into one piece of information are true, the value of a radar erroneous detection suspicion flag for the newly integrated fusion object information may be set as true. When the value of the radar erroneous detection suspicion flag for at least one of the plurality of pieces of fusion object information to be integrated into one piece of information is true, the value of a radar erroneous detection suspicion flag for the newly integrated fusion object information may be set as true. When the values of the radar erroneous detection suspicion flags for not less than half of the plurality of pieces of fusion object information to be integrated into one piece of information are true, the value of a radar erroneous detection suspicion flag for the newly integrated fusion object information may be set as true. When the values of the single-sensor detection flags for all the plurality of pieces of fusion object information to be integrated into one piece of information are true, the value of a single-sensor detection flag for the newly integrated fusion object information may be set as true, and when at least one of the values of the single-sensor detection flags for the plurality of pieces of fusion object information to be integrated into one piece of information is false, the value of a single-sensor detection flag for the newly integrated fusion object information may be set as false. In any case, the obtained fusion object information may be subjected to various post-processing such as tracking processing or smoothing processing, to correct the result, whereby accuracy or certainty can be enhanced. Movement of the vehicle 101 may be predicted on the basis of vehicle information acquired from the vehicle information sensor 3, and tracking processing may be performed on the basis of the prediction result. For example, the vehicle 101 may move during a time of a sensor processing delay, a millimeter-wave transmission delay, or the like, and therefore, the value outputted from the sensor which is the radar 11 or the camera 12 and the present value in the actual positional relationship of the vehicle 101 and the fusion object might be different. Therefore, tracking processing may be performed using a value corrected by predicting error between the sensor output value and the present value in the actual positional relationship of the vehicle 101 and the fusion object.

For each fusion object obtained through the fusion processing, the corresponding radar detected object information always exists. Therefore, as the value of the radar erroneous detection suspicion flag for the fusion object information, the value of the radar erroneous detection suspicion flag for the corresponding radar detected object information is used. That is, the value of the radar erroneous detection suspicion flag for each piece of radar detected object information is carried over as the radar erroneous detection suspicion flag for the corresponding fusion object information. In a case where the radar detected object information includes the radar erroneous detection information, the radar erroneous detection information is added to the corresponding fusion object information. In a case where the output cycle of the radar detected object information from the first detection device 1 and the execution cycle of the fusion processing by the fusion processing unit 7 are different from each other, corresponding radar detected object information might not exist in a certain execution cycle. In this case, the radar erroneous detection information of the fusion object information for the same fusion object in the previous cycle is carried over. Thus, the values of the corresponding radar erroneous detection suspicion flags are always carried over to all pieces of fusion object information.

A radar erroneous detection removal unit 8 acquires the fusion object information from the fusion processing unit 7, removes fusion object information determined to be suspected as erroneous detection, and outputs the remaining fusion object information that has not been removed, to an object selection unit 9. A determination method for whether or not to remove fusion object information in the radar erroneous detection removal unit 8 will be described in detail later.

The object selection unit 9 performs object selection processing on the fusion object information acquired from the radar erroneous detection removal unit 8, and outputs a selection result as a final object detection result. As the object selection processing, a method of removing fusion object information including a parameter that is outside a normal value range may be used, for example. That is, processing similar to that of the radar filter processing unit 5 or the camera filter processing unit 6 may be used. For the fusion object information, a priority may be calculated using a predetermined reference, and a predetermined number of pieces of fusion object information may be selected and outputted in the order from the highest priority. More specifically, in a case where there are actually N fusion objects but the number of them needs to be decreased to M (<N) due to constraints such as a processing load, for example, if the control processing block at the subsequent stage requires that an object in a short distance is preferentially outputted, priorities are set for the N pieces of fusion object information in the order from the one in a shorter distance, and M pieces of fusion object information having higher priorities are selected and outputted. As another example, if it is required that an object existing on the same lane as the vehicle 101 is prioritized, priorities may be set by referring to parameters such as a transverse position or lane information as well as a distance. As the object selection processing, any of the above methods may be used or a plurality of the methods may be combined. The processing in the object selection unit 9 may be skipped if unnecessary, and output of the radar erroneous detection removal unit 8 may be outputted as a final object detection result.

Figure 5:
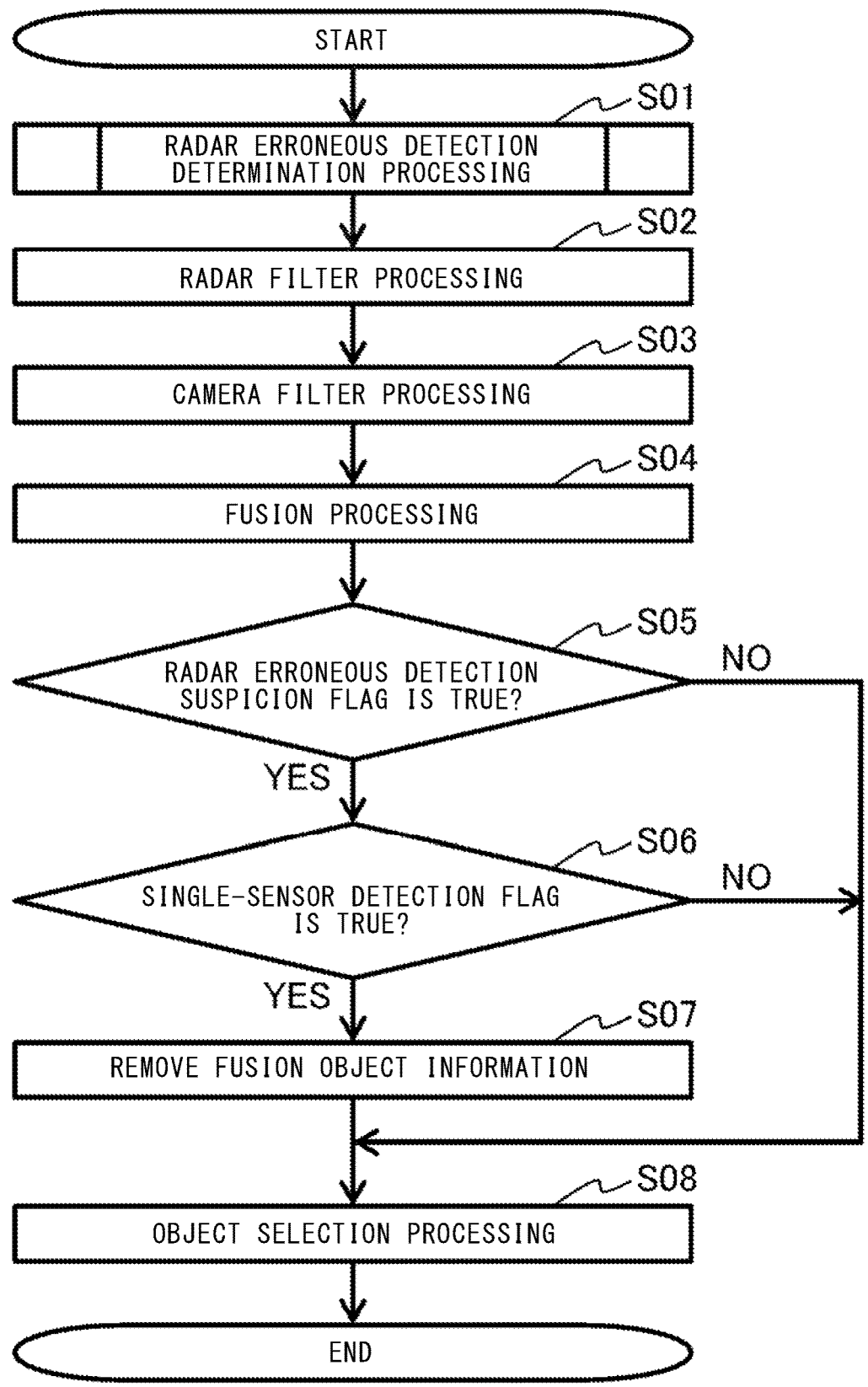
FIG. 5 is a flowchart illustrating operation of the object detection device according to the first embodiment.

FIG. 5 is a flowchart illustrating operation of the object detection device 100 according to the first embodiment. Step S01 is a radar erroneous detection determination step of performing radar erroneous detection determination processing, step S02 is a radar filter processing step of performing radar filter processing, step S03 is a camera filter processing step of performing camera filter processing, step S04 is a fusion processing step of performing fusion processing, step S05, step S06, and step S07 are a radar erroneous detection removal step of performing radar erroneous detection removal, and step S08 is an object selection step of selecting objects.

In step S01, the radar erroneous detection determination unit 4 determines whether or not each radar detected object information acquired from the first detection device 1 is suspected as erroneous detection. The radar erroneous detection determination unit 4 sets, as true, the radar erroneous detection suspicion flag for the radar detected object information determined to be suspected as erroneous detection, sets, as false, the radar erroneous detection suspicion flag for the radar detected object information not determined to be suspected as erroneous detection, and then outputs the radar detected object information to the radar filter processing unit 5. Then, the process proceeds to step S02. The determination method for erroneous detection will be described in detail later.

In step S02, the radar filter processing unit 5 performs the radar filter processing on each piece of radar detected object information acquired from the radar erroneous detection determination unit 4, and outputs the radar detected object information after the processing, to the fusion processing unit 7. Then, the process proceeds to step S03. In step S03, the camera filter processing unit 6 performs the camera filter processing on the second sensor detected object information acquired from the second detection device 2, and outputs the second sensor detected object information after the processing, to the fusion processing unit 7. Then, the process proceeds to step S04.

In step S04, the fusion processing unit 7 performs the fusion processing on the basis of the radar detected object information acquired from the radar filter processing unit 5 and the second sensor detected object information acquired from the camera filter processing unit 6, and regarding each fusion object obtained as a fusion processing result, outputs fusion object information including a fusion object position which is position information about the fusion object, to the radar erroneous detection removal unit 8. Then, the process proceeds to step S05. Step S02 and step S03 may be skipped. In a case where step S02 and step S03 are skipped, the fusion processing unit 7 performs the fusion processing on the basis of the radar detected object information acquired from the radar erroneous detection determination unit 4 and the second sensor detected object information acquired from the second detection device 2. In the fusion processing, for example, processing of carrying over the value of the radar erroneous detection suspicion flag from the radar detected object information to the fusion object information is also performed.

In step S05, the radar erroneous detection removal unit 8 confirms the value of the radar erroneous detection suspicion flag for each piece of fusion object information acquired from the fusion processing unit 7. If the radar erroneous detection suspicion flag is true, the process proceeds to step S06, and if the radar erroneous detection suspicion flag is false, the process proceeds to step S08. In step S06, the radar erroneous detection removal unit 8 confirms the value of the single-sensor detection flag for each piece of fusion object information. If the value of the single-sensor detection flag is true, the process proceeds to step S07, and if the value of the single-sensor detection flag is false, the process proceeds to step S08. In step S07, the radar erroneous detection removal unit 8 removes the fusion object information, and then the process proceeds to step S08. Through the processing in steps S05 to S07, the radar erroneous detection removal unit 8 removes the fusion object information for which the radar erroneous detection suspicion flag is true and the single-sensor detection flag is true, and outputs the fusion object information for which only one of the radar erroneous detection suspicion flag and the single-sensor detection flag is true or both of the radar erroneous detection suspicion flag and the single-sensor detection flag are false, to the object selection unit 9. That is, when the fusion object is an object detected by only the radar 11 and the detection by the radar 11 is suspected as erroneous detection, the radar erroneous detection removal unit 8 removes the fusion object information.

In step S08, the object selection unit 9 performs the object selection processing on each piece of fusion object information acquired from the radar erroneous detection removal unit 8, and outputs the selection result as a final object detection result. Step S08 may be skipped. In a case where step S08 is skipped, output of the radar erroneous detection removal unit 8 is outputted as a final object detection result.

Figure 6:
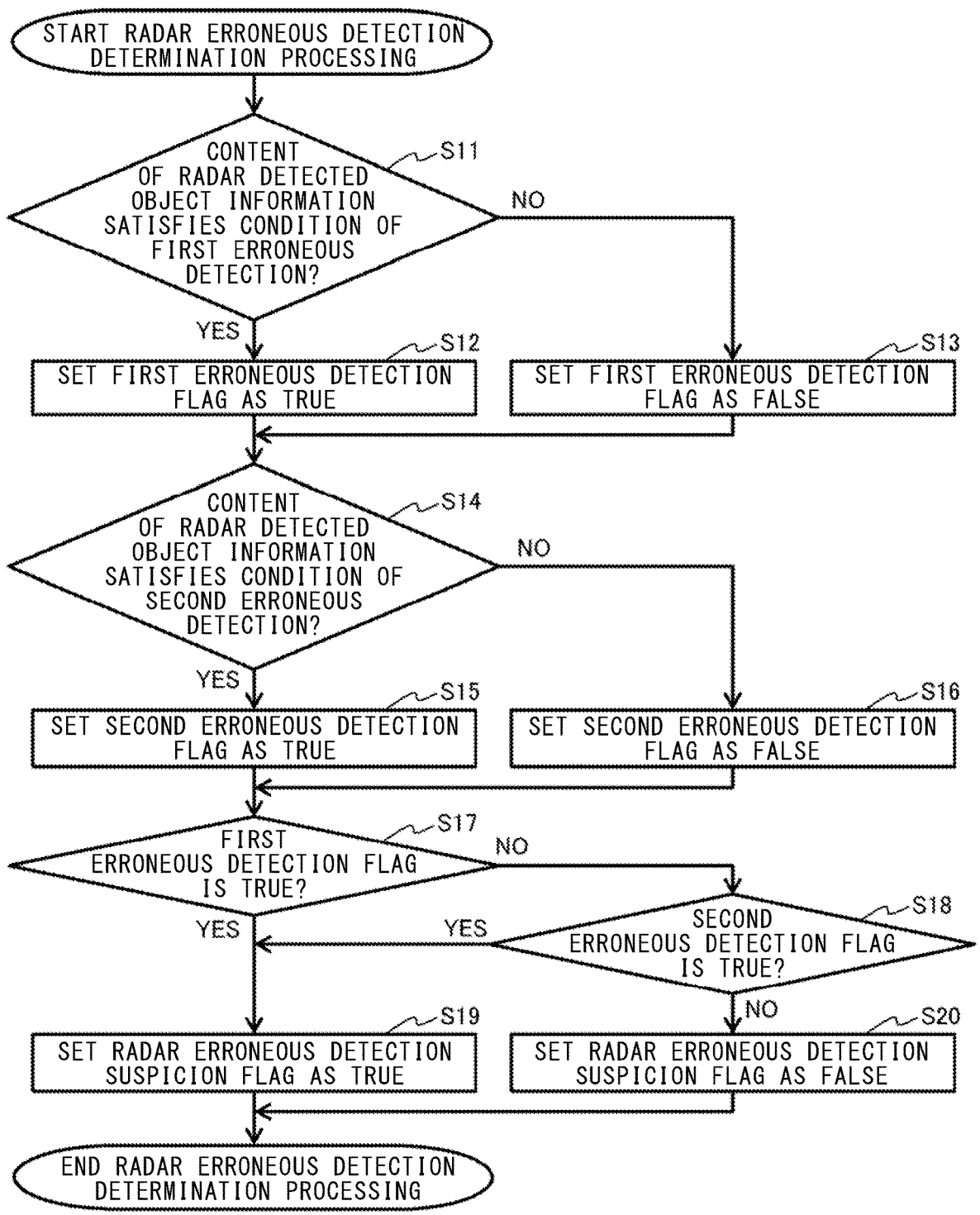
FIG. 6 is a flowchart showing the details of radar erroneous detection determination processing in a radar erroneous detection determination unit in the first embodiment.

FIG. 6 is a flowchart illustrating the content of the radar erroneous detection determination processing in the radar erroneous detection determination unit 4 in the first embodiment, and shows the details of the radar erroneous detection determination processing shown in step S01 in FIG. 5. Step S11 is a first erroneous detection determination step, step S12 and step S13 are a first erroneous detection flag setting step, step S14 is a second erroneous detection determination step, step S15 and step S16 are a second erroneous detection flag setting step, step S17 is a first erroneous detection flag confirmation step, step S18 is a second erroneous detection flag confirmation step, and step S19 and step S20 are radar erroneous detection suspicion flag setting steps.

In step S11, the radar erroneous detection determination unit 4 performs first erroneous detection determination for determining whether or not the content of each piece of radar detected object information acquired from the first detection device 1 satisfies a condition of first erroneous detection. The first erroneous detection determination is performed by confirming whether or not the content of the radar detected object information satisfies the condition of first erroneous detection. If the content of the radar detected object information satisfies the condition of first erroneous detection, the process proceeds to step S12, and if the content of the radar detected object information does not satisfy the condition of first erroneous detection, the process proceeds to step S13.

As described above, a noise 105 with a behavior of rushing out toward the vehicle center from a lateral side as shown in FIG. 3 might appear in output of the first detection device 1. Therefore, the radar detected object information indicating a behavior as shown by the noise 105 in FIG. 3 is determined to be due to first erroneous detection. In determination for first erroneous detection, information indicating the behavior of the radar detected object included in the radar detected object information is used. Here, the information indicating the behavior of the radar detected object is represented as time-series information about at least one of the radar detection position (longitudinal coordinate and transverse coordinate) which is position information about the radar detected object, the movement velocity (longitudinal velocity and transverse velocity) of the radar detected object, and the movement acceleration (longitudinal acceleration and transverse acceleration) of the radar detected object. Instead, information equivalent to the above information may be calculated and used. For example, instead of the movement velocity of the radar detected object, a result obtained by performing differential calculation (difference calculation) on the radar detection position may be used. More specifically, for example, "value transition through the present radar detection position, the radar detection position for one processing cycle ago, and the radar detection position for two processing cycles ago" or "value transition through the present transverse velocity, the transverse velocity for one processing cycle ago, and the transverse velocity for two processing cycles ago" is information indicating the behavior of the radar detected object. In the determination for first erroneous detection, whether or not information indicating the behavior of the radar detected object is a behavior of rushing out toward the vehicle center axis (transverse position=0) from a lateral side is determined. Specifically, for example, if the change amount of the radar detection position when the radar detected object moves toward the center in the left-right direction of the radar detection range 102 which is the detection range of the radar 11 has been greater than a predetermined first change amount threshold consecutively during a predetermined first observation period (e.g., period of three processing cycles), the radar erroneous detection determination unit 4 determines that the radar detected object information is due to first erroneous detection. That is, if the value of the velocity when the radar detected object moves toward the center in the left-right direction of the radar detection range 102 has been greater than the predetermined first change amount threshold consecutively during the predetermined first observation period, the radar erroneous detection determination unit 4 determines that the radar detected object information is due to first erroneous detection. In a case where the radar detected object information includes information about a first transverse velocity which is the movement velocity in the transverse direction of the radar detected object, if the absolute value of the first transverse velocity has been greater than a predetermined first transverse velocity threshold consecutively during the first observation period, the radar erroneous detection determination unit 4 may determine that the radar detected object information is due to first erroneous detection.

Regarding determination for first erroneous detection, instead of performing the determination for the entirety of the fusion range 104, the determination range may be limited such that, for example, the determination is performed only for a radar detected object existing at a short distance. In addition, for example, each threshold may be changed in accordance with the position, the velocity, or the acceleration of the radar detected object. In addition, for example, regarding the position, the velocity, or the acceleration of the radar detected object, a result obtained by performing path coordinate conversion in accordance with the inclination of the vehicle 101 using the radar detected object information acquired from the first detection device 1 and the vehicle information acquired from the vehicle information sensor 3, may be used. Similarly, regarding the velocity of the radar detected object, instead of the movement velocity (velocity relative to vehicle 101) of the radar detected object in the radar detected object information, a value obtained by converting the movement velocity of the radar detected object to a velocity relative to ground using the velocity of the vehicle 101 on the basis of the radar detected object information acquired from the first detection device 1 and the vehicle information acquired from the vehicle information sensor 3, may be used. In addition, for example, for the radar detected object determined to be due to first erroneous detection once, the determination result as first erroneous detection may be kept for the same object during certain cycles or until the radar detected object determined to be due to first erroneous detection is no longer detected.

In step S12, the radar erroneous detection determination unit 4 sets the value of a first erroneous detection flag for the radar detected object information, as true, and then the process proceeds to step S14. In step S13, the radar erroneous detection determination unit 4 sets the value of the first erroneous detection flag for the radar detected object information, as false, and then the process proceeds to step S14.

In step S14, second erroneous detection determination is performed to determine whether or not the content of each piece of radar detected object information acquired from the first detection device 1 satisfies a condition of second erroneous detection. The second erroneous detection determination is performed by confirming whether or not the content of the radar detected object information satisfies the condition of second erroneous detection. If the content of the radar detected object information satisfies the condition of second erroneous detection, the process proceeds to step S15, and if the content of the radar detected object information does not satisfy the condition of second erroneous detection, the process proceeds to step S16. As described above, a noise 106 having a large size might appear in a short distance as shown in FIG. 4, in output of the first detection device 1. Therefore, the radar detected object information indicating a state as shown by the noise 106 in FIG. 4 is determined to be due to second erroneous detection. In the determination for second erroneous detection, information indicating the property of the radar detected object included in the radar detected object information is used. Here, information indicating the property of the radar detected object is represented as present information or time-series information about at least one of the reflection intensity (or RCS), the size (width, length, and height), the type, the radar detection position (longitudinal coordinate and transverse coordinate), and reliability of the radar detected object. More specifically, for example, in a case where the radar detected object information includes information about the size of the radar detected object and information about the reflection intensity for the radar detected object, the size of the radar detected object is greater than a predetermined size threshold, and the reflection intensity for the radar detected object is smaller than a predetermined reflection intensity threshold, the radar erroneous detection determination unit 4 determines that the radar detected object information is due to second erroneous detection. In addition, for example, in a case where the radar detected object information includes information about the reflection intensity for the radar detected object, a distance from the radar 11 to the radar detection position of the radar detected object is smaller than a predetermined second distance threshold (e.g., when the radar detection position is in a predefined target range where the vehicle 101 executes control), and the reflection intensity for the radar detected object is smaller than a predetermined reflection intensity threshold, the radar erroneous detection determination unit 4 determines that the radar detected object information is due to second erroneous detection. In addition, for example, in a case where the radar detected object information includes information about reliability for the radar detected object and information about the reflection intensity for the radar detected object, the reliability for the radar detected object is smaller than a predetermined reliability threshold, and the reflection intensity for the radar detected object is smaller than a predetermined reflection intensity threshold, the radar erroneous detection determination unit 4 determines that the radar detected object information is due to second erroneous detection.

Regarding determination for second erroneous detection, instead of performing the determination for the entirety of the fusion range 104, the determination range may be limited such that, for example, the determination is performed only for a radar detected object existing at a short distance. In addition, for example, in a case where the radar detected object information outputted from the first detection device 1 includes information about the type, the determination may be performed using information about the type, instead of information about the size of the radar detected object. More specifically, instead of confirming that the size of the radar detected object is greater than a predetermined size threshold, if the type of the radar detected object is a type corresponding to a large-sized object such as a vehicle, a truck, or a wide object, it may be determined that a condition for the size of the radar detected object is satisfied. In addition, for example, using time-series information about information indicating the property of the radar detected object, if the radar detected object suddenly appears, suddenly appears at a short distance, or suddenly appears near the front, the determination condition may be relaxed so that the radar detected object information is likely to be determined to be due to second erroneous detection. The reason is as follows. If the radar detected object is an actually existing object, the object should not suddenly appear and it is general that such an object is first detected at a long distance or a transverse position near the angle of view of the radar and then moves to a close or front position. Therefore, an object that suddenly appears (in particular, an object at a short distance or an object having a large size) is highly likely to be due to second erroneous detection. In addition, for example, regarding the position of the radar detected object, a result obtained by performing path coordinate conversion in accordance with the inclination of the vehicle 101 using the radar detected object information acquired from the first detection device 1 and the vehicle information acquired from the vehicle information sensor 3, may be used. In addition, for example, for the radar detected object determined to be due to second erroneous detection once, the determination result as second erroneous detection may be kept for the same object during certain cycles or until the radar detected object determined to be due to second erroneous detection is no longer detected.

In step S15, the radar erroneous detection determination unit 4 sets the value of a second erroneous detection flag for the radar detected object information, as true, and then the process proceeds to step S17. In step S16, the radar erroneous detection determination unit 4 sets the value of the second erroneous detection flag for the radar detected object information, as false, and then the process proceeds to step S17.

In step S17, the radar erroneous detection determination unit 4 confirms whether or not the first erroneous detection flag for each piece of radar detected object information is true. If the first erroneous detection flag is true, the process proceeds to step S19, and if the first erroneous detection flag is not true, i.e., the first erroneous detection flag is false, the process proceeds to step S18. In step S18, the radar erroneous detection determination unit 4 confirms whether or not the second erroneous detection flag for each piece of radar detected object information is true. If the second erroneous detection flag is true, the process proceeds to step S19, and if the second erroneous detection flag is not true, i.e., the second erroneous detection flag is false, the process proceeds to step S20. In step S19, the radar erroneous detection determination unit 4 sets the value of the radar erroneous detection suspicion flag for the radar detected object information, as true, thus ending the radar erroneous detection determination processing. In step S20, the radar erroneous detection determination unit 4 sets the value of the radar erroneous detection suspicion flag for the radar detected object information, as false, thus ending the radar erroneous detection determination processing.

The order between the processing relevant to first erroneous detection performed in steps S11 to S13 and the processing relevant to second erroneous detection performed in steps S14 to S16 may be reversed. Only one of the processing relevant to first erroneous detection and the processing relevant to second erroneous detection may be performed. In a case of performing only one of the processing relevant to first erroneous detection and the processing relevant to second erroneous detection, the value of the flag obtained through the performed processing is directly used as the value of the radar erroneous detection suspicion flag.

The radar erroneous detection determination unit 4 may acquire, as the vehicle information, information about the velocity, the yaw rate, the azimuth, or the position of the vehicle 101, from the vehicle information sensor 3, and change at least one of the first observation period, the first change amount threshold, the first transverse velocity threshold, the size threshold, the reflection intensity threshold, the second distance threshold, and the reliability threshold, in accordance with the vehicle information, in determination for first erroneous detection and determination for second erroneous detection. When the vehicle 101 travels at a high speed, the possibility that an actually existing object (that is not a noise) appears at a high relative velocity or an actually existing object suddenly appears in front of or near the vehicle 101, becomes higher than when the vehicle 101 travels at a low speed. In addition, as the velocity of the vehicle 101 becomes higher, for an occupant, a risk that brake control or notification is not performed with respect to an actually existing object becomes higher than a risk that noise cannot be removed and erroneous brake control or notification is performed. Therefore, the radar erroneous detection determination unit 4 may acquire velocity information of the vehicle 101 from the vehicle information sensor 3, and change at least one of the first observation period, the first change amount threshold, the first transverse velocity threshold, the size threshold, the reflection intensity threshold, the second distance threshold, and the reliability threshold so that, as the velocity of the vehicle 101 becomes higher, the radar detected object information is less likely to be determined to be due to erroneous detection (i.e., fusion object information is less likely to be removed), whereby it is possible to perform determination with a lower risk for an occupant.

The radar erroneous detection determination unit 4 may acquire outside environment information including at least one of weather, a time, a temperature, a road surface state, and a peripheral structure placement condition (guard rail placement condition, tree placement interval, etc.), and change at least one of the first observation period, the first change amount threshold, the first transverse velocity threshold, the size threshold, the reflection intensity threshold, the second distance threshold, and the reliability threshold in accordance with the outside environment information, in determination for first erroneous detection and determination for second erroneous detection. For example, during night-time, the detection performance of the camera 12 is greatly reduced. Therefore, if the radar erroneous detection suspicion flag is set as true, the corresponding fusion object information is highly likely to be removed. During night-time, for an occupant, a risk that brake control or notification is not performed with respect to an actually existing object becomes higher than a risk that noise cannot be removed and erroneous brake control or notification is performed. Therefore, the radar erroneous detection determination unit 4 may acquire time information, and during night-time, may change at least one of the first observation period, the first change amount threshold, the first transverse velocity threshold, the size threshold, the reflection intensity threshold, the second distance threshold, and the reliability threshold so that the radar detected object information is less likely to be determined to be due to erroneous detection (i.e., fusion object information is less likely to be removed). In rainy weather or snowy weather, the detection performance of the camera 12 is reduced as compared to a normal case. Therefore, the radar erroneous detection determination unit 4 may acquire weather information, and in rainy weather or snowy weather, change at least one of the first observation period, the first change amount threshold, the first transverse velocity threshold, the size threshold, the reflection intensity threshold, the second distance threshold, and the reliability threshold so that the radar detected object information is less likely to be determined to be due to erroneous detection (i.e., fusion object information is less likely to be removed). In a case where the temperature is low and the road surface is frozen, even though the sensor detection performance is equal to that in a normal case, the braking distance when performing control of braking or deceleration becomes longer, and thus it is necessary to execute control also for an obstacle at a longer distance. Therefore, the radar erroneous detection determination unit 4 may acquire temperature information, and when the temperature is low, change each threshold so that even an object at a long distance is likely to be determined to be due to erroneous detection. For example, the radar erroneous detection determination unit 4 may acquire temperature information, and when the temperature is higher than a predetermined temperature threshold, the radar erroneous detection determination unit 4 may perform determination for first erroneous detection or determination for second erroneous detection with respect to only the radar detected object existing at a short distance in the fusion range 104. On the other hand, when the temperature is not higher than the temperature threshold, the radar erroneous detection determination unit 4 may perform determination for first erroneous detection and determination for second erroneous detection with respect to the radar detected object existing in a wider range so that even an object at a long distance is likely to be determined to be due to erroneous detection. In addition, for example, in a case where guard rails or trees are placed near the traveling road, if the pole interval of the guard rails or the tree arrangement interval is short, a plurality of poles or trees are clustered into one object through processing in the radar ECU, so that an object having a large size is likely to appear. In general, guard rails or trees are not present on the traveling road and are not targets of control or notification. Therefore, such objects should be removed as being due to radar erroneous detection (although they are actually existing objects). Therefore, in a case where information that there is such a structure is acquired, for example, in this area, each threshold such as the size threshold may be changed so that the structure generated by clustering is likely to be determined to be due to erroneous detection, in determination for second erroneous detection.

The radar erroneous detection determination unit 4 may acquire map information, and acquire position information from the vehicle information sensor 3, and may change at least one of the first observation period, the first change amount threshold, the first transverse velocity threshold, the size threshold, the reflection intensity threshold, the second distance threshold, and the reliability threshold in accordance with the map information and the position information, in determination for first erroneous detection and determination for second erroneous detection. The map information is information acquired or recorded in advance, and is information representing a general map of an area where the vehicle 101 travels or a high-definition map including information such as a peripheral structure placement condition (guard rail placement condition, tree placement interval, etc.). For example, in a case where it has been found out that radar erroneous detection is likely to occur in a specific area on the map through previous investigation, preliminary traveling, operation confirmation, or the like, when the position is in the specific area, the radar erroneous detection determination unit 4 may change at least one of the first observation period, the first change amount threshold, the first transverse velocity threshold, the size threshold, the reflection intensity threshold, the second distance threshold, and the reliability threshold so that the radar detected object information is likely to be determined to be due to erroneous detection. In addition, for example, in a case where there are many obstacles near the vehicle 101 as in a case of traveling on a narrow road, objects close to each other are less likely to be separated in the signal processing inside the first detection device 1, so that noise might become likely to occur. Therefore, in a case where the position is on a narrow road, the radar erroneous detection determination unit 4 may change at least one of the first observation period, the first change amount threshold, the first transverse velocity threshold, the size threshold, the reflection intensity threshold, the second distance threshold, and the reliability threshold so that the radar detected object information is likely to be determined to be due to erroneous detection.

As described above, the object detection device 100 according to the first embodiment detects an object on the basis of information from the first detection device 1 which outputs, regarding a radar detected object which is an object detected from output of the radar 11, radar detected object information including a radar detection position which is position information about the radar detected object, and information from the second detection device 2 which outputs, regarding a second sensor detected object which is an object detected from output of a second sensor different from the radar 11, second sensor detected object information including a second sensor detection position which is position information about the second sensor detected object, the object detection device 100 including: the radar erroneous detection determination unit 4 which determines whether or not the radar detected object information acquired from the first detection device 1 is suspected as erroneous detection, and sets, as true, the radar erroneous detection suspicion flag for the radar detected object information determined to be suspected as erroneous detection; the fusion processing unit 7 which outputs fusion object information including a fusion object position which is position information about a fusion object on the basis of the second sensor detected object information and the radar detected object information acquired from the radar erroneous detection determination unit 4; and the radar erroneous detection removal unit 8 which removes the fusion object information determined to be suspected as erroneous detection. When the radar detected object and the second sensor detected object are determined to be one fusion object, the fusion processing unit 7 integrates the radar detected object information and the second sensor detected object information for the respective objects as one piece of the fusion object information, and sets the single-sensor detection flag for the integrated fusion object information, as false. When the fusion object is determined to be an object detected by only the radar 11, the fusion processing unit 7 uses the radar detected object information for the radar detected object as the fusion object information, and sets the single-sensor detection flag for the fusion object information, as true. The radar erroneous detection removal unit 8 removes the fusion object information for which the radar erroneous detection suspicion flag is true and the single-sensor detection flag is true. Thus, output of an erroneous fusion object due to erroneous detection based on information of the radar 11 can be prevented. In addition, the fusion object information for the fusion object detected by only the radar 11 is targeted for removal, whereby the fusion object information can be prevented from being erroneously removed.

Second Embodiment

Figure 7:
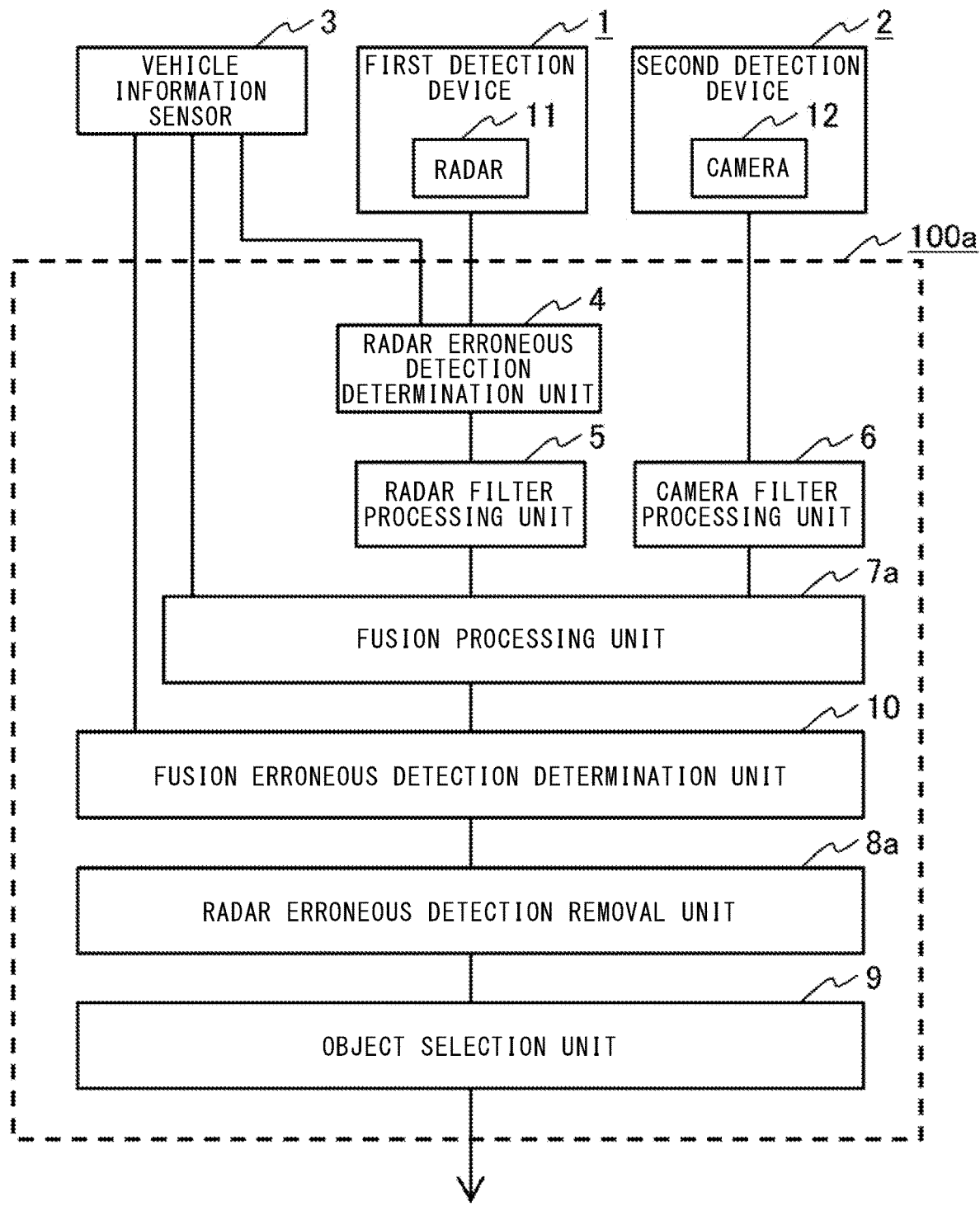
FIG. 7 is a block diagram showing the configuration of an object detection device according to the second embodiment of the present disclosure.

FIG. 7 is a block diagram showing the configuration of an object detection device 100a according to the second embodiment of the present disclosure. In the object detection device 100a according to the second embodiment shown in FIG. 7, a fusion erroneous detection determination unit 10 is added, a fusion processing unit 7a is provided instead of the fusion processing unit 7, and a radar erroneous detection removal unit 8a is provided instead of the radar erroneous detection removal unit 8, as compared to the object detection device 100 according to the first embodiment shown in FIG. 1. The other configurations of the object detection device 100a according to the second embodiment are the same as those of the object detection device 100 according to the first embodiment.

The fusion processing unit 7a performs the same operation as the fusion processing unit 7, and also performs tracking processing or integration processing of integrating a plurality of fusion objects for which the distance between fusion object positions included in respective pieces of fusion object information is smaller than a predetermined third distance threshold, into one piece of information, and outputting the integrated information as new fusion object information.

The fusion erroneous detection determination unit 10 acquires the fusion object information from the fusion processing unit 7a, and determines whether or not each piece of fusion object information is suspected as erroneous detection. The fusion erroneous detection determination unit 10 sets, as true, a fusion erroneous detection suspicion flag for the fusion object information determined to be suspected as erroneous detection, sets, as false, the fusion erroneous detection suspicion flag for the fusion object information not determined to be suspected as erroneous detection, and then outputs the fusion object information. After determining whether or not each piece of fusion object information is suspected as erroneous detection, the fusion erroneous detection determination unit 10 may add fusion erroneous detection information indicating determination that there is suspicion of erroneous detection, to the fusion object information determined to be suspected as erroneous detection, and output the fusion object information. The fusion erroneous detection determination unit 10 may determine whether or not each piece of fusion object information is suspected as erroneous detection, on the basis of the fusion object information outputted from the fusion processing unit 7a and the vehicle information outputted from the vehicle information sensor 3. A determination method for erroneous detection in the fusion erroneous detection determination unit 10 will be described in detail later.

The radar erroneous detection removal unit 8a acquires the fusion object information from the fusion erroneous detection determination unit 10, removes fusion object information determined to be suspected as erroneous detection, and outputs the remaining fusion object information that has not been removed, to the object selection unit 9. A determination method for whether or not to remove fusion object information in the radar erroneous detection removal unit 8a will be described in detail later.

Figure 8:
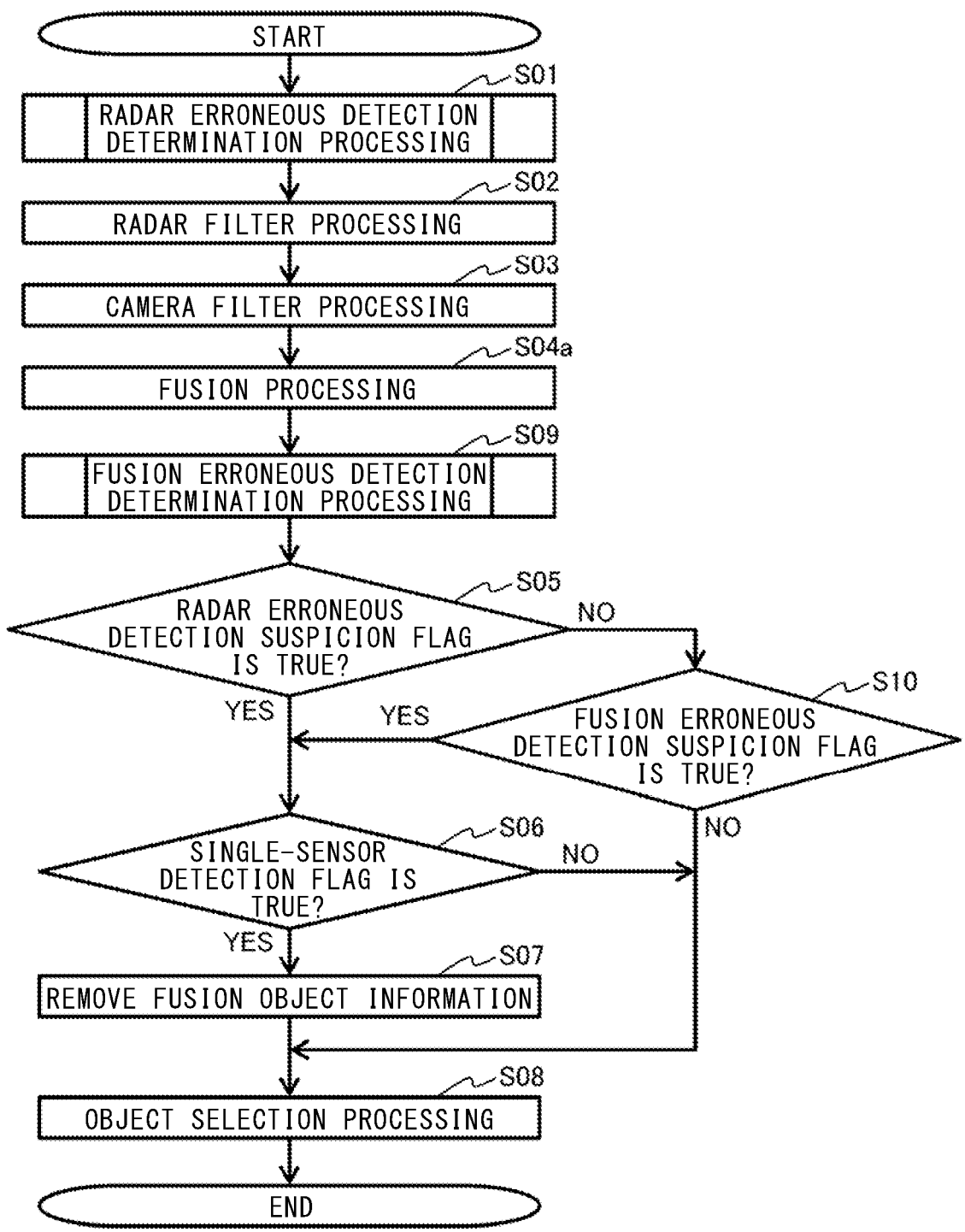
FIG. 8 is a flowchart illustrating operation of the object detection device according to the second embodiment.

FIG. 8 is a flowchart illustrating operation of the object detection device 100a according to the second embodiment. In FIG. 8, processing in steps S01 to S03, processing in step S05, and processing in steps S06 to S08 are the same as processing in steps S01 to S03, processing in step S05, and processing in steps S06 to S08 in the object detection device 100 according to the first embodiment shown in FIG. 5. Step S04a is a fusion processing step of performing fusion processing, step S09 is a fusion erroneous detection determination processing step of performing fusion erroneous detection determination processing, and step S05, step S10, step S06, and step S07 are a radar erroneous detection removal step of performing radar erroneous detection removal.

In step S04a, the fusion processing unit 7a performs the same processing as the fusion processing unit 7, and also performs integration processing of integrating a plurality of fusion objects for which the distance between fusion object positions included in respective pieces of fusion object information is smaller than the predetermined third distance threshold, into one piece of information, and outputting the integrated information as new fusion object information. Then, regarding each fusion object obtained as a result, the fusion processing unit 7a outputs fusion object information including a fusion object position which is position information about the fusion object, to the fusion erroneous detection determination unit 10. Then, the process proceeds to step S09.

In step S09, the fusion erroneous detection determination unit 10 determines whether or not each piece of fusion object information acquired from the fusion processing unit 7a is suspected as erroneous detection. Then, the fusion erroneous detection determination unit 10 sets, as true, the fusion erroneous detection suspicion flag for the fusion object information determined to be suspected as erroneous detection, sets, as false, the fusion erroneous detection suspicion flag for the fusion object information not determined to be suspected as erroneous detection, and outputs the fusion object information to the radar erroneous detection removal unit 8a. Then, the process proceeds to step S05. A determination method for erroneous detection will be described in detail later.

In step S05, the radar erroneous detection removal unit 8a confirms the value of the radar erroneous detection suspicion flag for each piece of fusion object information acquired from the fusion processing unit 7a. If the radar erroneous detection suspicion flag is true, the process proceeds to step S06, and if the radar erroneous detection suspicion flag is false, the process proceeds to step S10. In step S10, the radar erroneous detection removal unit 8a confirms the value of the fusion erroneous detection suspicion flag for each piece of fusion object information acquired from the fusion processing unit 7a. If the fusion erroneous detection suspicion flag is true, the process proceeds to step S06, and if the fusion erroneous detection suspicion flag is false, the process proceeds to step S08. In step S06, the radar erroneous detection removal unit 8a confirms the value of the single-sensor detection flag for each piece of fusion object information. If the value of the single-sensor detection flag is true, the process proceeds to step S07, and if the value of the single-sensor detection flag is false, the process proceeds to step S08. In step S07, the radar erroneous detection removal unit 8a removes the fusion object information, and then the process proceeds to step S08. Through the processing in steps S05 to S07 and the processing in step S10, the radar erroneous detection removal unit 8a removes the fusion object information for which the radar erroneous detection suspicion flag is true and the single-sensor detection flag is true, and the fusion object information for which the fusion erroneous detection suspicion flag is true and the single-sensor detection flag is true, and outputs the remaining fusion object information to the object selection unit 9. That is, when the fusion object is an object detected by only the radar 11 and the detection by the radar 11 is suspected as erroneous detection, the radar erroneous detection removal unit 8 removes the fusion object information, and also, when the fusion object is an object detected by only the radar 11 and the behavior of the fusion object is the same as the behavior of a fusion object suspected as erroneous detection of the radar 11, the radar erroneous detection removal unit 8 removes the fusion object information.

In step S08, the object selection unit 9 performs object selection processing on each piece of fusion object information acquired from the radar erroneous detection removal unit 8a, and outputs the selection result as a final object detection result. Step S08 may be skipped. In a case where step S08 is skipped, output of the radar erroneous detection removal unit 8a is outputted as a final object detection result.

Figure 9:
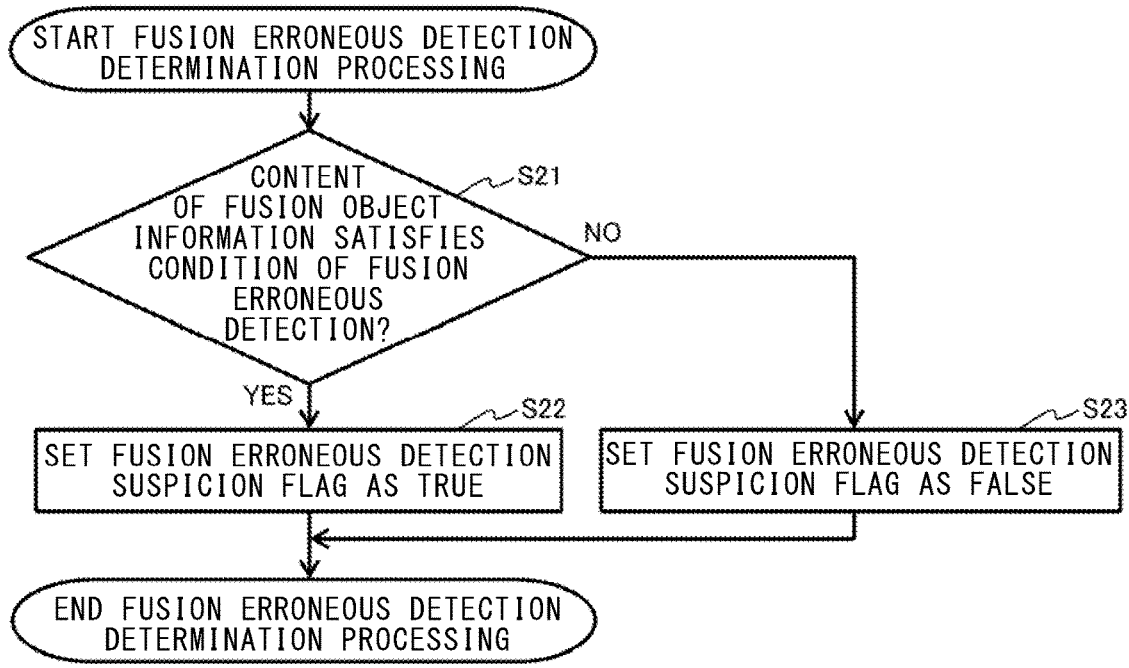
FIG. 9 is a flowchart showing the details of fusion erroneous detection determination processing in a fusion erroneous detection determination unit in the second embodiment.

FIG. 9 is a flowchart illustrating the content of the fusion erroneous detection determination processing in the fusion erroneous detection determination unit 10 in the second embodiment, and shows the details of the fusion erroneous detection determination processing shown in step S09 in FIG. 8. Step S21 is a fusion erroneous detection determination step, and step S22 and step S23 are a fusion erroneous detection suspicion flag setting step.

In step S21, the fusion erroneous detection determination unit 10 performs fusion erroneous detection determination for determining whether or not the content of each piece of fusion object information acquired from the fusion processing unit 7a satisfies a condition of fusion erroneous detection. The fusion erroneous detection determination is performed by confirming whether or not the content of the fusion object information satisfies the condition of fusion erroneous detection. If the content of the fusion object information satisfies the condition of fusion erroneous detection, the process proceeds to step S22, and if the content of fusion object information does not satisfy the condition of fusion erroneous detection, the process proceeds to step S23.

The condition of fusion erroneous detection may be the same as the condition of first erroneous detection in the radar erroneous detection determination unit 4, and for example, fusion object information indicating a behavior as shown by the noise 105 in FIG. 3 is determined to be due to fusion erroneous detection. Here, information indicating the behavior of the fusion object is represented as time-series information about at least one of the fusion object position (longitudinal coordinate and transverse coordinate) which is position information of the fusion object, the movement velocity (longitudinal velocity and transverse velocity) of the fusion object, and the movement acceleration (longitudinal acceleration and transverse acceleration) of the fusion object. Instead, information equivalent to the above information may be calculated and used. For example, instead of the movement velocity of the fusion object, a result obtained by performing differential calculation (difference calculation) on the fusion object position may be used. More specifically, for example, "value transition through the present fusion object position, the fusion object position for one processing cycle ago, and the fusion object position for two processing cycles ago" or "value transition through the present transverse velocity of the fusion object, the transverse velocity of the fusion object for one processing cycle ago, and the transverse velocity of the fusion object for two processing cycles ago" is information indicating the behavior of the fusion object. In the determination for fusion erroneous detection, whether or not information indicating the behavior of the fusion object is a behavior of rushing out toward the vehicle center axis (transverse position=0) from a lateral side is determined. Specifically, for example, if the change amount of the fusion object position when the fusion object moves toward the center in the left-right direction of the radar detection range 102 which is the detection range of the radar 11 has been greater than a predetermined second change amount threshold consecutively during a predetermined second observation period (e.g., period of three processing cycles), the fusion erroneous detection determination unit 10 determines that the fusion object information is due to fusion erroneous detection. That is, if the value of the velocity when the fusion object moves toward the center in the left-right direction of the radar detection range 102 has been greater than the predetermined second change amount threshold consecutively during the predetermined second observation period, the fusion erroneous detection determination unit 10 determines that the fusion object information is due to fusion erroneous detection. In a case where the fusion object information includes information about a second transverse velocity which is the movement velocity in the transverse direction of the fusion object, if the absolute value of the second transverse velocity has been greater than the predetermined second transverse velocity threshold consecutively during the second observation period, the fusion erroneous detection determination unit 10 may determine that the fusion object information is due to fusion erroneous detection. Here, the second observation period may be the same as the first observation period used for the radar erroneous detection determination in the radar erroneous detection determination unit 4, the second change amount threshold may be the same as the first change amount threshold used for the radar erroneous detection determination in the radar erroneous detection determination unit 4, and the second transverse velocity threshold may be the same as the first transverse velocity threshold used for the radar erroneous detection determination in the radar erroneous detection determination unit 4.

In step S22, the fusion erroneous detection determination unit 10 sets the value of the fusion erroneous detection suspicion flag for the fusion object information, as true, thus ending the fusion erroneous detection determination processing. In step S23, the fusion erroneous detection determination unit 10 sets the value of the fusion erroneous detection suspicion flag for the fusion object information, as false, thus ending the fusion erroneous detection determination processing.

The fusion erroneous detection determination unit 10 may acquire, as the vehicle information, information about the velocity, the yaw rate, the azimuth, or the position of the vehicle 101, from the vehicle information sensor 3, and change at least one of the second observation period, the second change amount threshold, and the second transverse velocity threshold in accordance with the vehicle information, in determination for fusion erroneous detection. For example, the fusion erroneous detection determination unit 10 may acquire velocity information of the vehicle 101 from the vehicle information sensor 3, and change at least one of the second observation period, the second change amount threshold, and the second transverse velocity threshold so that, as the velocity of the vehicle 101 becomes higher, the fusion object information is less likely to be determined to be due to erroneous detection (i.e., fusion object information is less likely to be removed), whereby it is possible to perform determination with a lower risk for an occupant.

The fusion erroneous detection determination unit 10 may acquire outside environment information including at least one of weather, a time, a temperature, a road surface state, and a peripheral structure placement condition (guard rail placement condition, tree placement interval, etc.), and change at least one of the second observation period, the second change amount threshold, and the second transverse velocity threshold in accordance with the outside environment information, in determination for fusion erroneous detection. For example, the fusion erroneous detection determination unit 10 may acquire time information, and during night-time, may change at least one of the second observation period, the second change amount threshold, and the second transverse velocity threshold so that the fusion object information is less likely to be determined to be suspected as erroneous detection (i.e., fusion object information is less likely to be removed). In rainy weather or snowy weather, the detection performance of the camera 12 is reduced as compared to a normal case. Therefore, the fusion erroneous detection determination unit 10 may acquire weather information, and in rainy weather or snowy weather, change at least one of the second observation period, the second change amount threshold, and the second transverse velocity threshold so that the fusion object information is less likely to be determined to be suspected as erroneous detection (i.e., fusion object information is less likely to be removed). The fusion erroneous detection determination unit 10 may acquire temperature information, and when the temperature is low, change each threshold so that even an object at a long distance is likely to be determined to be suspected as erroneous detection. For example, in a case where guard rails or trees are placed near the traveling road, if the pole interval of the guard rails or the tree arrangement interval is short, a plurality of poles or trees are clustered into one object, so that an object having a large size is likely to appear. In general, guard rails or trees are not present on the traveling road and are not targets of control or notification. Therefore, such objects should be removed as being due to fusion erroneous detection (although they are actually existing objects). Therefore, in a case where information that there is such a structure is acquired, for example, in this area, each threshold such as the size threshold may be changed so that the structure generated by clustering is likely to be determined to be due to erroneous detection, in determination by the fusion erroneous detection determination unit 10.

The fusion erroneous detection determination unit 10 may acquire map information, and acquire position information from the vehicle information sensor 3, and may change at least one of the second observation period, the second change amount threshold, and the second transverse velocity threshold in accordance with the map information and the position information, in determination for fusion erroneous detection. For example, in a case where it has been found out that radar erroneous detection is likely to occur in a specific area on the map through previous investigation, preliminary traveling, operation confirmation, or the like, when the position is in the specific area, the fusion erroneous detection determination unit 10 may change at least one of the second observation period, the second change amount threshold, and the second transverse velocity threshold so that the fusion object information is likely to be determined to be suspected as erroneous detection. In a case where the position is on a narrow road, the fusion erroneous detection determination unit 10 may change at least one of the second observation period, the second change amount threshold, and the second transverse velocity threshold so that the fusion object information is likely to be determined to be suspected as erroneous detection.

As described above, the object detection device 100a according to the second embodiment further includes the fusion erroneous detection determination unit 10 which determines whether or not the fusion object information acquired from the fusion processing unit 7a is suspected as erroneous detection, and sets, as true, the fusion erroneous detection suspicion flag for the fusion object information determined to be suspected as erroneous detection. The fusion processing unit 7a integrates a plurality of pieces of fusion object information for which the distance between the fusion object positions included in the respective pieces of fusion object information is smaller than the predetermined third distance threshold, into one piece of information, and outputs the integrated information as new fusion object information. In a case where the change amount of the fusion object position when the fusion object moves toward the center in the left-right direction of the detection range of the radar 11 has been greater than the predetermined second change amount threshold during the predetermined second observation period, or in a case where the fusion object information includes information about the second transverse velocity which is the movement velocity in the transverse direction of the fusion object and the absolute value of the second transverse velocity has been greater than the predetermined second transverse velocity threshold during the second observation period, the fusion erroneous detection determination unit 10 determines that the fusion object information is suspected as erroneous detection. The radar erroneous detection removal unit 8a removes the fusion object information for which the radar erroneous detection suspicion flag is true and the single-sensor detection flag is true, and removes the fusion object information for which the fusion erroneous detection suspicion flag is true and the single-sensor detection flag is true. Thus, output of an erroneous fusion object due to erroneous detection based on information of the radar 11 can be further prevented.

As a result of the fusion processing, a plurality of objects may be merged, or various correction processing such as tracking processing may be performed, and thus, the value of each parameter such as the position or the velocity generally differs between the radar detected object information and the fusion object information. Therefore, even if the radar detected object information is not determined to be suspected as erroneous detection, the corresponding fusion object might indicate the same behavior as noise. In this case, with the object detection device 100a according to the second embodiment, output of an erroneous fusion object due to erroneous detection based on information of the radar 11 can be further prevented.

In the embodiments, as shown in FIG. 2, the case where the radar 11 and the camera 12 which is the second sensor are placed as two sensors on the front side of the vehicle 101, has been described. However, placement of the sensors is not limited to the front side, and the sensors may be placed at a position other than the front side, e.g., the rear side or a lateral side. The radar 11 and the second sensor may be placed at different surfaces of the vehicle 101, as long as their respective detection ranges partially overlap each other, i.e., a fusion range exists. The second sensor may be a sensor provided to a roadside unit (infrastructure sensor).

The object detection device according to each embodiment has such a feature that, even in a case where information about an object detected by the radar 11 is determined to be suspected as erroneous detection, if the second sensor has detected the identical object, information about the object is not determined to be suspected as erroneous detection. Accordingly, it suffices that the second sensor has object detection characteristics (in other words, erroneous detection tendency) different from those of the radar 11.

Therefore, the second sensor may be a radar that uses a frequency different from that of the radar 11. Alternatively, while the second sensor is the same sensor as the radar 11, detection signal processing in the second detection device 2 may be different from detection signal processing in the first detection device 1.

The second sensor may be a combination of a plurality of sensors. For example, the radar 11, a camera, and an ultrasonic sensor may be placed on the front side of the vehicle 101, and processing may be performed such that the camera is used as the second sensor for a fusion range from a short distance to a long distance from the vehicle 101, and the ultrasonic sensor is used as the second sensor for a fusion range in a very short distance from the vehicle 101. In addition, for example, with the radar 11, a camera, and a LiDAR sensor placed on the front side of the vehicle 101 and using the camera and the LiDAR sensor as the second sensor, an object detected by at least one of the camera and the LiDAR sensor may be regarded as a second sensor detected object, and when the second sensor detection position of the second sensor detected object is inside the predetermined identical-object determination range including the radar detection position of the corresponding radar detected object, the single-sensor detection flag may be set as false. Alternatively, for example, with the radar 11, the camera, and the LiDAR sensor placed on the front side of the vehicle 101 and using the camera and the LiDAR sensor as the second sensor, an object detected by both of the camera and the LiDAR sensor may be regarded as a second sensor detected object, and when the second sensor detection position of the second sensor detected object is inside the predetermined identical-object determination range including the radar detection position of the corresponding radar detected object, the single-sensor detection flag may be set as false.

Figure 10:
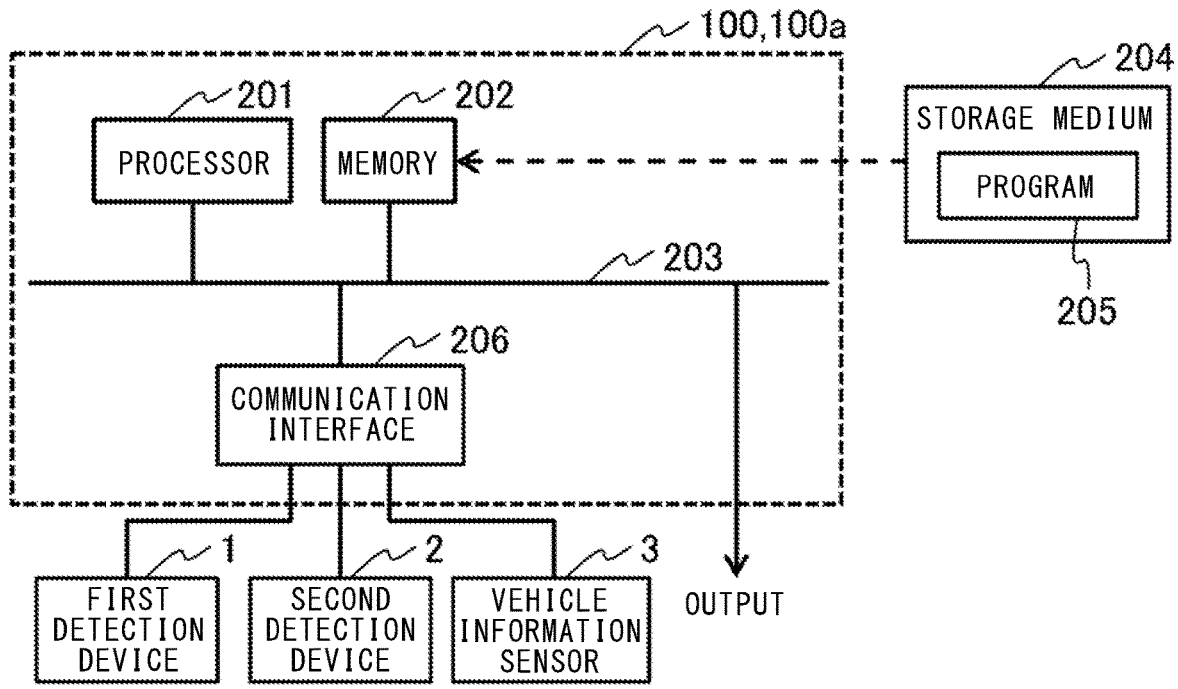
FIG. 10 is a schematic diagram showing an example of the hardware configuration of the object detection device according to each embodiment.

FIG. 10 is a schematic diagram showing an example of the hardware configuration of the object detection device 100, 100a according to each embodiment. The radar erroneous detection determination unit 4, the radar filter processing unit 5, the camera filter processing unit 6, the fusion processing unit 7, 7a, the radar erroneous detection removal unit 8, 8a, the object selection unit 9, and the fusion erroneous detection determination unit 10 are implemented by a processor 201 such as a central processing unit (CPU) which executes a program stored in a memory 202. The program stored in the memory 202 may be a program 205 stored in a storage medium 204, for example. That is, it can be said that the program is for causing a computer to execute a procedure of operations of components of the object detection device 100, 100a and the object detection method thereof. The memory 202 can also be used as a temporary storage device in each processing executed by the processor 201. The memory 202 is a nonvolatile or volatile semiconductor memory such as a RAM, a ROM, a flash memory, or an EPROM, a magnetic disk, an optical disc, or a combination thereof. The processor 201 and the memory 202 are connected to a bus 203. The first detection device 1, the second detection device 2, and the vehicle information sensor 3 are connected to a bus 203 via a communication interface 206. The communication interface 206 connecting the bus 203 and each of the first detection device 1, the second detection device 2, and the vehicle information sensor 3, may be a wired communication type or a wireless communication type, and may be formed of one interface for transmitting/receiving a plurality of kinds of signals, or a plurality of interfaces having individual functions.

Figure 11:
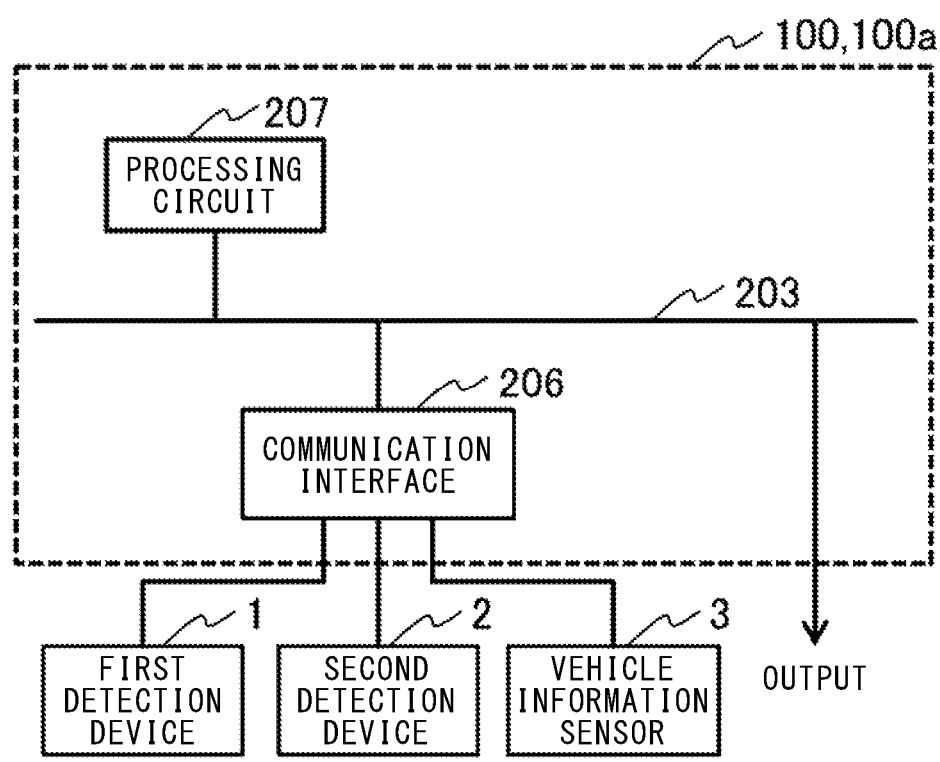
FIG. 11 is a schematic diagram showing another example of the hardware configuration of the object detection device according to each embodiment.

FIG. 11 is a schematic diagram showing another example of the hardware configuration of the object detection device 100, 100a according to each embodiment. In FIG. 11, a processing circuit 207 is connected to the bus 203, and the first detection device 1, the second detection device 2, and the vehicle information sensor 3 are connected to the bus 203 via the communication interface 206. In a case where the processing circuit 207 is dedicated hardware, the processing circuit 207 is, for example, a single circuit, a complex circuit, a programed processor, an application specific integrated circuit (ASIC), a field programmable gate array (FPGA), or a combination thereof. Each function of the object detection device 100, 100a may be implemented by the processing circuit 207, or the functions may be collectively implemented by the processing circuit 207. Some of the functions of the object detection device 100, 100a may be implemented by dedicated hardware and others may be implemented by software or firmware.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 first detection device
2 second detection device
3 vehicle information sensor
4 radar erroneous detection determination unit
5 radar filter processing unit
6 camera filter processing unit
7, 7a fusion processing unit
8, 8a radar erroneous detection removal unit
9 object selection unit
10 fusion erroneous detection determination unit
11 radar
12 camera
100, 100a object detection device
101 vehicle
102 radar detection range
103 camera detection range
104 fusion range
105 noise
106 noise
201 processor
202 memory
203 bus
204 storage medium
205 program
206 communication interface
207 processing circuit

What is claimed is:

1. An object detection device for detecting an object on the basis of information from a first detection device which outputs, regarding a radar detected object which is an object detected from output of a radar, radar detected object information including a radar detection position which is position information about the radar detected object, and information from a second detection device which outputs, regarding a second sensor detected object which is an object detected from output of a second sensor different from the radar, second sensor detected object information including a second sensor detection position which is position information about the second sensor detected object, the object detection device comprising:
   a radar erroneous detection determination circuitry to determine whether or not the radar detected object information acquired from the first detection device is suspected as erroneous detection, and sets, as true, a radar erroneous detection suspicion flag for the radar detected object information determined to be suspected as erroneous detection;
   a fusion processing circuitry to output fusion object information including a fusion object position which is position information about a fusion object, on the basis of the second sensor detected object information and the radar detected object information acquired from the radar erroneous detection determination circuitry; and
   a radar erroneous detection removal circuitry to remove the fusion object information determined to be suspected as erroneous detection, wherein
   the fusion processing circuitry
      when the radar detected object and the second sensor detected object are determined to be one said fusion object, integrates the radar detected object information and the second sensor detected object information for the respective objects as one piece of the fusion object information, and sets a single-sensor detection flag for the integrated fusion object information, as false, and
      when the fusion object is determined to be an object detected by only the radar, uses the radar detected object information for the radar detected object as the fusion object information, and sets the single-sensor detection flag for the fusion object information, as true, and
   the radar erroneous detection removal circuitry removes the fusion object information for which the radar erroneous detection suspicion flag is true and the single-sensor detection flag is true.

2. The object detection device according to claim 1, wherein
   when the radar detected object information acquired from the first detection device is determined to be due to at least one of first erroneous detection and second erroneous detection, the radar erroneous detection determination circuitry determines that the radar detected object information acquired from the first detection device is suspected as erroneous detection,
   the radar erroneous detection determination circuitry determines that the radar detected object information is due to the first erroneous detection, in a case where
      a change amount of the radar detection position when the radar detected object moves toward a center in a left-right direction of a detection range of the radar has been greater than a predetermined first change amount threshold during a predetermined first observation period, or
      the radar detected object information includes information about a first transverse velocity which is a movement velocity in a transverse direction of the radar detected object and an absolute value of the first transverse velocity has been greater than a predetermined first transverse velocity threshold during the first observation period, and
   the radar erroneous detection determination circuitry determines that the radar detected object information is due to the second erroneous detection, in a case where
      the radar detected object information includes information about a size of the radar detected object and information about a reflection intensity for the radar detected object, the size of the radar detected object is greater than a predetermined size threshold, and the reflection intensity for the radar detected object is smaller than a predetermined reflection intensity threshold,
      the radar detected object information includes the information about the reflection intensity for the radar detected object, a distance from the radar to the radar detection position of the radar detected object is smaller than a predetermined second distance threshold, and the reflection intensity for the radar detected object is smaller than the predetermined reflection intensity threshold, or
      the radar detected object information includes information about reliability for the radar detected object and the information about the reflection intensity for the radar detected object, the reliability for the radar detected object is smaller than a predetermined reliability threshold, and the reflection intensity for the radar detected object is smaller than the predetermined reflection intensity threshold.

3. The object detection device according to claim 2, wherein
   the radar erroneous detection determination circuitry
      acquires, as vehicle information, information about a velocity, a yaw rate, an azimuth, or a position of a vehicle, from a vehicle information sensor, and
      changes at least one of the first observation period, the first change amount threshold, the first transverse velocity threshold, the size threshold, the reflection intensity threshold, the second distance threshold, and the reliability threshold, in accordance with the vehicle information.

4. The object detection device according to claim 2, wherein
   the radar erroneous detection determination circuitry
      acquires outside environment information including at least one of weather, a time, a temperature, a road surface state, and a peripheral structure placement condition, and
      changes at least one of the first observation period, the first change amount threshold, the first transverse velocity threshold, the size threshold, the reflection intensity threshold, the second distance threshold, and the reliability threshold, in accordance with the outside environment information.

5. The object detection device according to claim 2, wherein
   the radar erroneous detection determination circuitry
      acquires map information, and acquires position information about a vehicle from a vehicle information sensor, and
      changes at least one of the first observation period, the first change amount threshold, the first transverse velocity threshold, the size threshold, the reflection intensity threshold, the second distance threshold, and the reliability threshold, in accordance with the map information and the position information.

6. The object detection device according to claim 2, further comprising a fusion erroneous detection determination circuitry which determines whether or not the fusion object information acquired from the fusion processing circuitry is suspected as erroneous detection, and sets, as true, a fusion erroneous detection suspicion flag for the fusion object information determined to be suspected as erroneous detection, wherein the fusion processing circuitry integrates a plurality of pieces of the fusion object information for which a distance between the fusion object positions included in the respective pieces of the fusion object information is smaller than a predetermined third distance threshold, into one piece of information, and outputs the integrated information as new fusion object information, the fusion erroneous detection determination circuitry determines that the fusion object information is suspected as erroneous detection, in a case where a change amount of the fusion object position when the fusion object moves toward a center in a left-right direction of a detection range of the radar has been greater than a predetermined second change amount threshold during a predetermined second observation period, or the fusion object information includes information about a second transverse velocity which is a movement velocity in a transverse direction of the fusion object and an absolute value of the second transverse velocity has been greater than a predetermined second transverse velocity threshold during the second observation period, and the radar erroneous detection removal circuitry removes the fusion object information for which the radar erroneous detection suspicion flag is true and the single-sensor detection flag is true, and removes the fusion object information for which the fusion erroneous detection suspicion flag is true and the single-sensor detection flag is true.

7. The object detection device according to claim 6, wherein the fusion erroneous detection determination circuitry acquires, as vehicle information, information about a velocity, a yaw rate, an azimuth, or a position of the vehicle, from a vehicle information sensor, and changes at least one of the second observation period, the second change amount threshold, and the second transverse velocity threshold, in accordance with the vehicle information.

8. The object detection device according to claim 6, wherein the fusion erroneous detection determination circuitry acquires outside environment information including at least one of weather, a time, a temperature, a road surface state, and a peripheral structure placement condition, and changes at least one of the second observation period, the second change amount threshold, and the second transverse velocity threshold, in accordance with the outside environment information.

9. The object detection device according to claim 6, wherein the fusion erroneous detection determination circuitry acquires map information, and acquires position information about a vehicle from a vehicle information sensor, and changes at least one of the second observation period, the second change amount threshold, and the second transverse velocity threshold, in accordance with the map information and the position information.

10. The object detection device according to claim 1, further comprising a fusion erroneous detection determination circuitry which determines whether or not the fusion object information acquired from the fusion processing circuitry is suspected as erroneous detection, and sets, as true, a fusion erroneous detection suspicion flag for the fusion object information determined to be suspected as erroneous detection, wherein the fusion processing circuitry integrates a plurality of pieces of the fusion object information for which a distance between the fusion object positions included in the respective pieces of the fusion object information is smaller than a predetermined third distance threshold, into one piece of information, and outputs the integrated information as new fusion object information, the fusion erroneous detection determination circuitry determines that the fusion object information is suspected as erroneous detection, in a case where a change amount of the fusion object position when the fusion object moves toward a center in a left-right direction of a detection range of the radar has been greater than a predetermined second change amount threshold during a predetermined second observation period, or the fusion object information includes information about a second transverse velocity which is a movement velocity in a transverse direction of the fusion object and an absolute value of the second transverse velocity has been greater than a predetermined second transverse velocity threshold during the second observation period, and the radar erroneous detection removal circuitry removes the fusion object information for which the radar erroneous detection suspicion flag is true and the single-sensor detection flag is true, and removes the fusion object information for which the fusion erroneous detection suspicion flag is true and the single-sensor detection flag is true.

11. The object detection device according to claim 10, wherein the fusion erroneous detection determination circuitry acquires, as vehicle information, information about a velocity, a yaw rate, an azimuth, or a position of the vehicle, from a vehicle information sensor, and changes at least one of the second observation period, the second change amount threshold, and the second transverse velocity threshold, in accordance with the vehicle information.

12. The object detection device according to claim 10, wherein the fusion erroneous detection determination circuitry acquires outside environment information including at least one of weather, a time, a temperature, a road surface state, and a peripheral structure placement condition, and changes at least one of the second observation period, the second change amount threshold, and the second transverse velocity threshold, in accordance with the outside environment information.

13. The object detection device according to claim 10, wherein the fusion erroneous detection determination circuitry acquires map information, and acquires position information about a vehicle from a vehicle information sensor, and changes at least one of the second observation period, the second change amount threshold, and the second transverse velocity threshold, in accordance with the map information and the position information.

14. An object detection method for detecting an object on the basis of information from a first detection device which outputs, regarding a radar detected object which is an object detected from output of a radar, radar detected object information including a radar detection position which is position information about the radar detected object, and information from a second detection device which outputs, regarding a second sensor detected object which is an object detected from output of a second sensor different from the radar, second sensor detected object information including a second sensor detection position which is position information about the second sensor detected object, the object detection method comprising:

a radar erroneous detection determination determining whether or not the radar detected object information acquired from the first detection device is suspected as erroneous detection, and setting, as true, a radar erroneous detection suspicion flag for the radar detected object information determined to be suspected as erroneous detection;

a fusion processing outputting fusion object information including a fusion object position which is position information about a fusion object, on the basis of the second sensor detected object information and the radar detected object information processed in the radar erroneous detection determination; and a radar erroneous detection removal removing the fusion object information determined to be suspected as erroneous detection, wherein in the fusion processing, when the radar detected object and the second sensor detected object are determined to be one said fusion object, the radar detected object information and the second sensor detected object information for the respective objects are integrated as one piece of the fusion object information, and a single-sensor detection flag for the integrated fusion object information is set as false, and when the fusion object is determined to be an object detected by only the radar, the radar detected object information for the radar detected object is used as the fusion object information, and the single-sensor detection flag for the fusion object information is set as true, and in the radar erroneous detection removal, the fusion object information for which the radar erroneous detection suspicion flag is true and the single-sensor detection flag is true, is removed.

15. A non-transitory computer-readable storage medium storing a program for causing a computer to execute the object detection method according to claim 14.

* * * * *